United States Patent
Sekiguchi et al.

(10) Patent No.: US 11,366,229 B2
(45) Date of Patent: Jun. 21, 2022

(54) RANGE FINDING METHOD, RANGE FINDING APPARATUS, AND RANGE FINDING SYSTEM

(71) Applicants: Hiroyoshi Sekiguchi, Kanagawa (JP); Hidetaka Miyajima, Kanagawa (JP); Shigeru Ouchida, Tokyo (JP)

(72) Inventors: Hiroyoshi Sekiguchi, Kanagawa (JP); Hidetaka Miyajima, Kanagawa (JP); Shigeru Ouchida, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 265 days.

(21) Appl. No.: 16/745,391

(22) Filed: Jan. 17, 2020

(65) Prior Publication Data
US 2020/0233087 A1 Jul. 23, 2020

(30) Foreign Application Priority Data

Jan. 22, 2019 (JP) .............................. JP2019-008763

(51) Int. Cl.
*G01S 17/86* (2020.01)
*G06T 7/521* (2017.01)
(Continued)

(52) U.S. Cl.
CPC .............. *G01S 17/86* (2020.01); *G01S 17/34* (2020.01); *G01S 17/931* (2020.01); *G06T 7/521* (2017.01);
(Continued)

(58) Field of Classification Search
CPC ........ G01S 17/86; G01S 17/931; G01S 17/34; G06T 7/521; G06T 2207/10028; G06T 2207/30252
See application file for complete search history.

(56) References Cited

U.S. PATENT DOCUMENTS 7,046,015 B2 * 5/2006 Suginouchi ............... G01F 1/66
 73/609
7,499,638 B2 * 3/2009 Arai ......................... G01S 17/86
 396/108
(Continued)

FOREIGN PATENT DOCUMENTS

EP 3 276 576 A1 1/2018
JP 2013-217853 10/2013
WO 2018/196001 A1 11/2018

OTHER PUBLICATIONS

Extended European Search Report dated Jun. 5, 2020 in European Patent Application No. 20151291.0, 10 pages.
(Continued)

*Primary Examiner* — Gregory M Desire
(74) *Attorney, Agent, or Firm* — Xsensus LLP

(57) ABSTRACT

A method of finding a range to a target object includes extracting a signal component from a beat signal obtained by synthesizing a transmission wave irradiated onto the target object and a reflection wave reflected and received from the target object, generating a matching evaluation value of a plurality of image data of the target object captured by an imaging device, fusing the signal component and the matching evaluation value before generating a distance image from the matching evaluation value, and setting distance information for each pixel of the image data of the target object based on the signal component and the matching evaluation value fused together to generate a distance image.

14 Claims, 36 Drawing Sheets

(51) Int. Cl.
  *G01S 17/931* (2020.01)
  *G01S 17/34* (2020.01)
(52) U.S. Cl.
  CPC .............. *G06T 2207/10028* (2013.01); *G06T 2207/30252* (2013.01)

(56) References Cited

U.S. PATENT DOCUMENTS

| | | | | |
|---|---|---|---|---|
| 8,436,747 | B2* | 5/2013 | Schoepp | B60Q 1/444 |
| | | | | 340/903 |
| 8,866,668 | B2* | 10/2014 | Kitagawa | G01S 13/584 |
| | | | | 342/159 |
| 9,207,680 | B1* | 12/2015 | Agarwal | G06K 9/00791 |
| 10,398,006 | B2* | 8/2019 | Nakamura | B60Q 1/02 |
| 10,564,392 | B2* | 2/2020 | Watanabe | H04N 5/23212 |
| 10,908,257 | B2* | 2/2021 | Motoyama | G01S 7/40 |
| 2011/0170086 | A1 | 7/2011 | Oohchida | |
| 2011/0188843 | A1 | 8/2011 | Oohchida | |
| 2011/0310290 | A1 | 12/2011 | Oohchida | |
| 2013/0182102 | A1 | 7/2013 | Kitajima et al. | |
| 2015/0160332 | A1 | 6/2015 | Sebastian et al. | |
| 2015/0332103 | A1 | 11/2015 | Yokota et al. | |
| 2016/0349371 | A1 | 12/2016 | Suzuki et al. | |
| 2018/0024246 | A1* | 1/2018 | Jeong | G02F 1/313 |
| | | | | 359/204.1 |
| 2018/0120108 | A1 | 5/2018 | Takahashi et al. | |
| 2018/0165834 | A1 | 6/2018 | Sekiguchi et al. | |
| 2018/0357783 | A1 | 12/2018 | Takahashi et al. | |
| 2019/0228537 | A1 | 7/2019 | Sekiguchi et al. | |
| 2019/0391244 | A1 | 12/2019 | Sekiguchi et al. | |
| 2020/0233087 | A1* | 7/2020 | Sekiguchi | G01S 17/86 |

OTHER PUBLICATIONS

Hem'an Badino et al., "Integrating LIDAR into Stereo for Fast and Improved Disparity Computation" China, 2011 International Conference on 3D Imaging, Modeling, Processing, Visualization and Transmission, May 16, 2011.

* cited by examiner

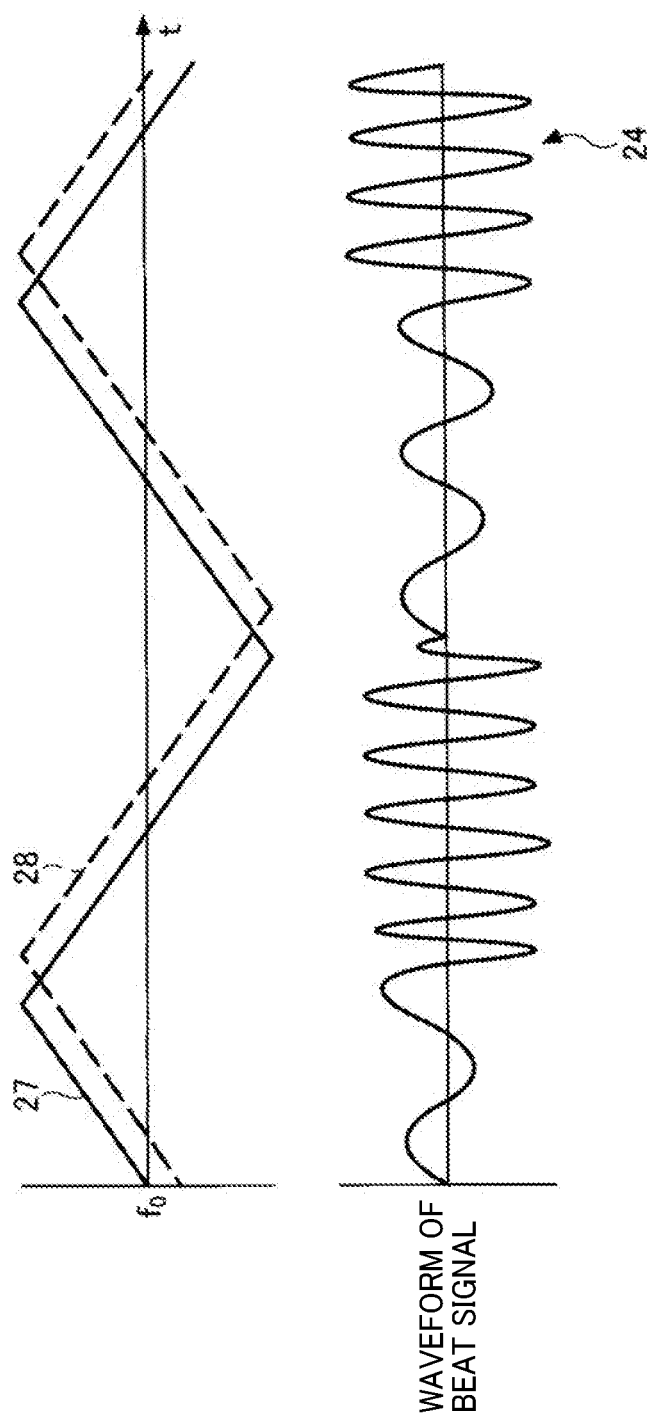

IMAGE CAPTURE RANGE

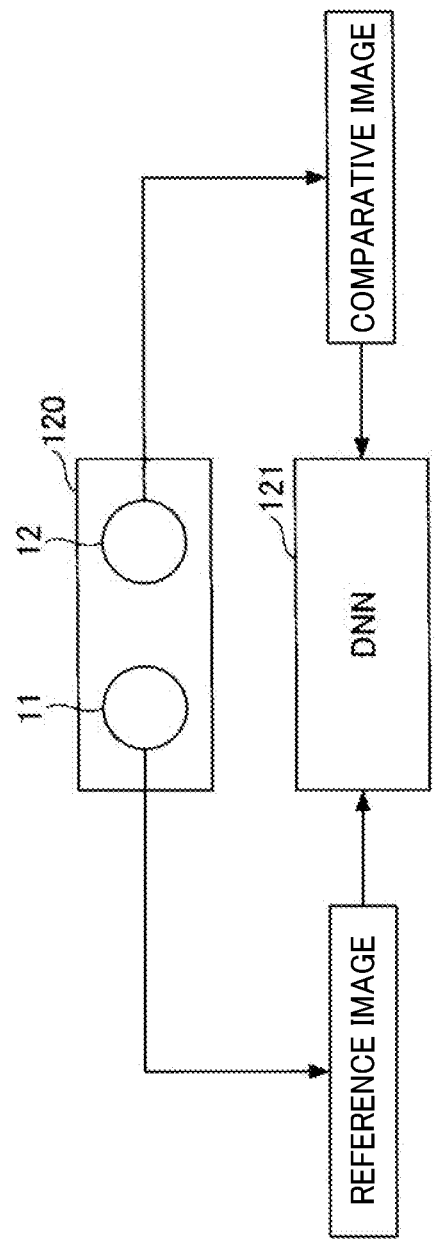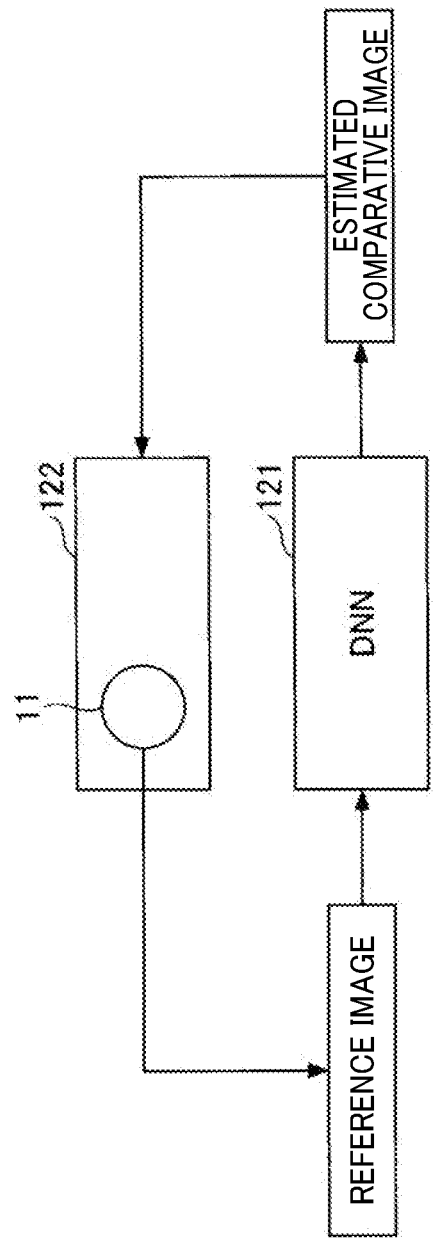

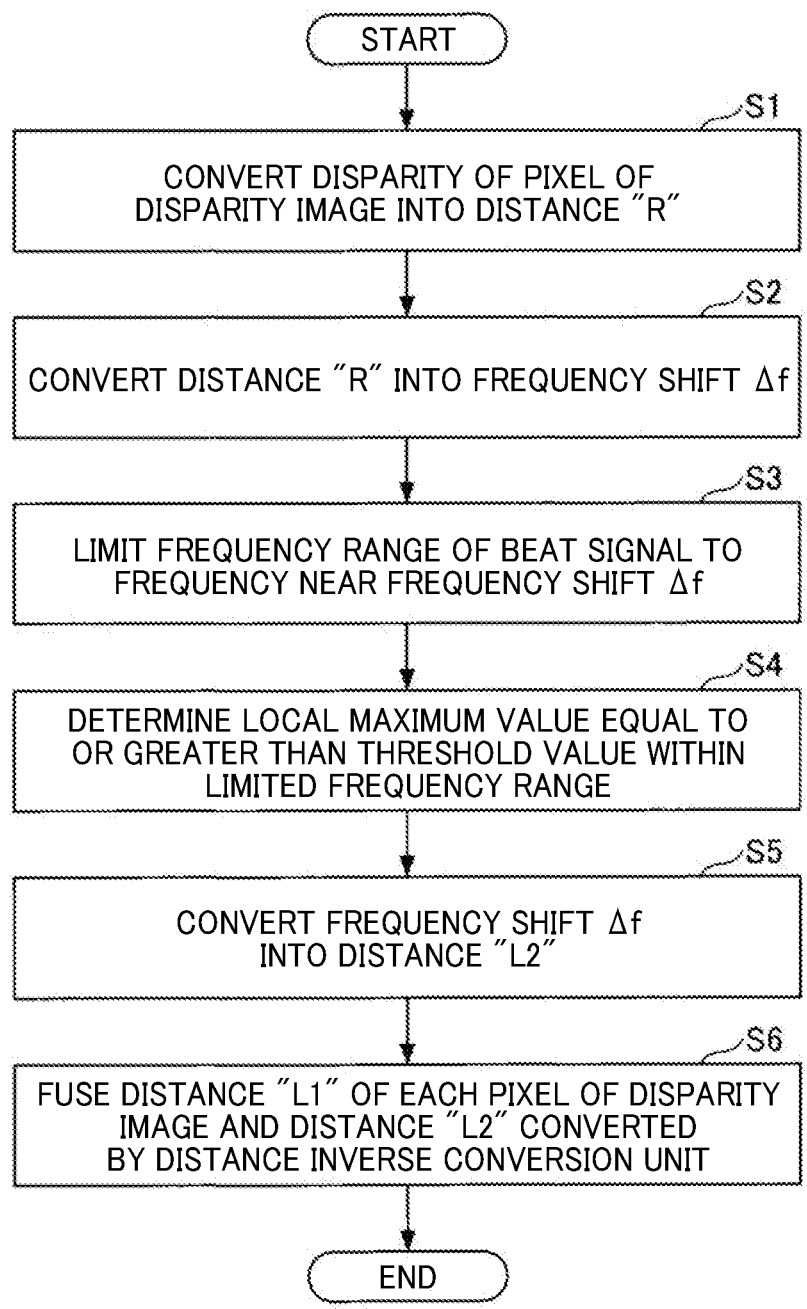

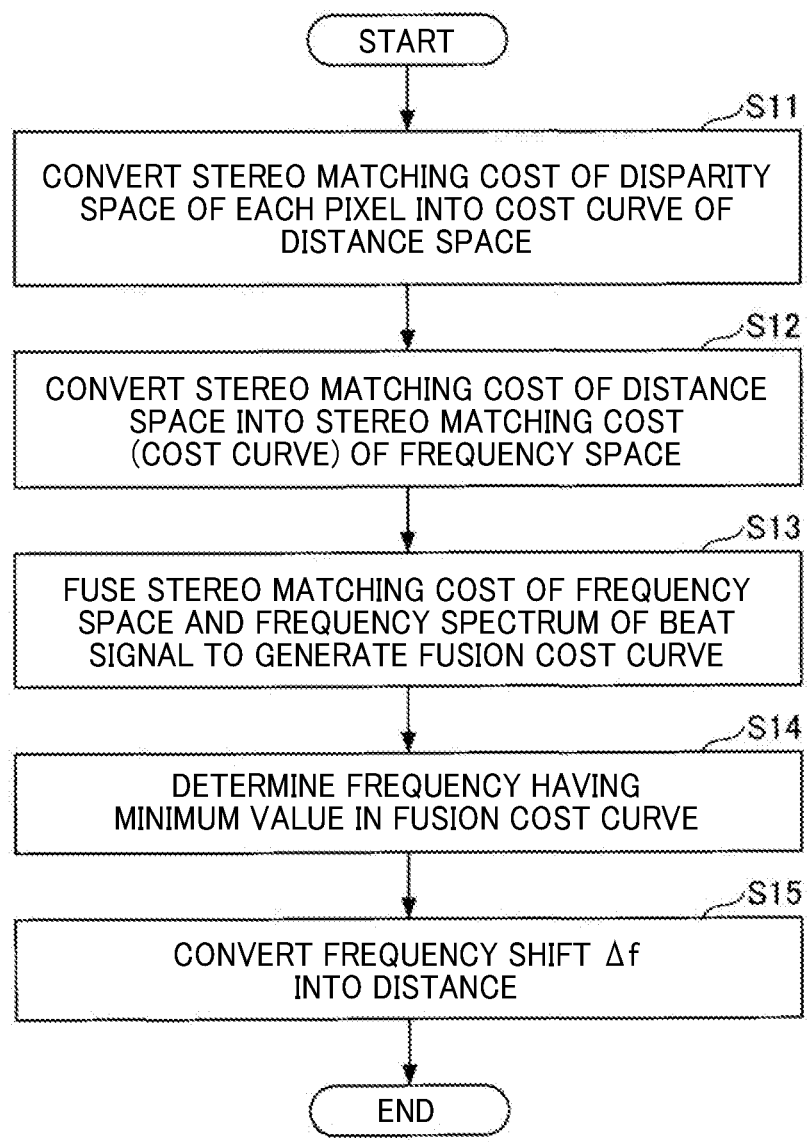

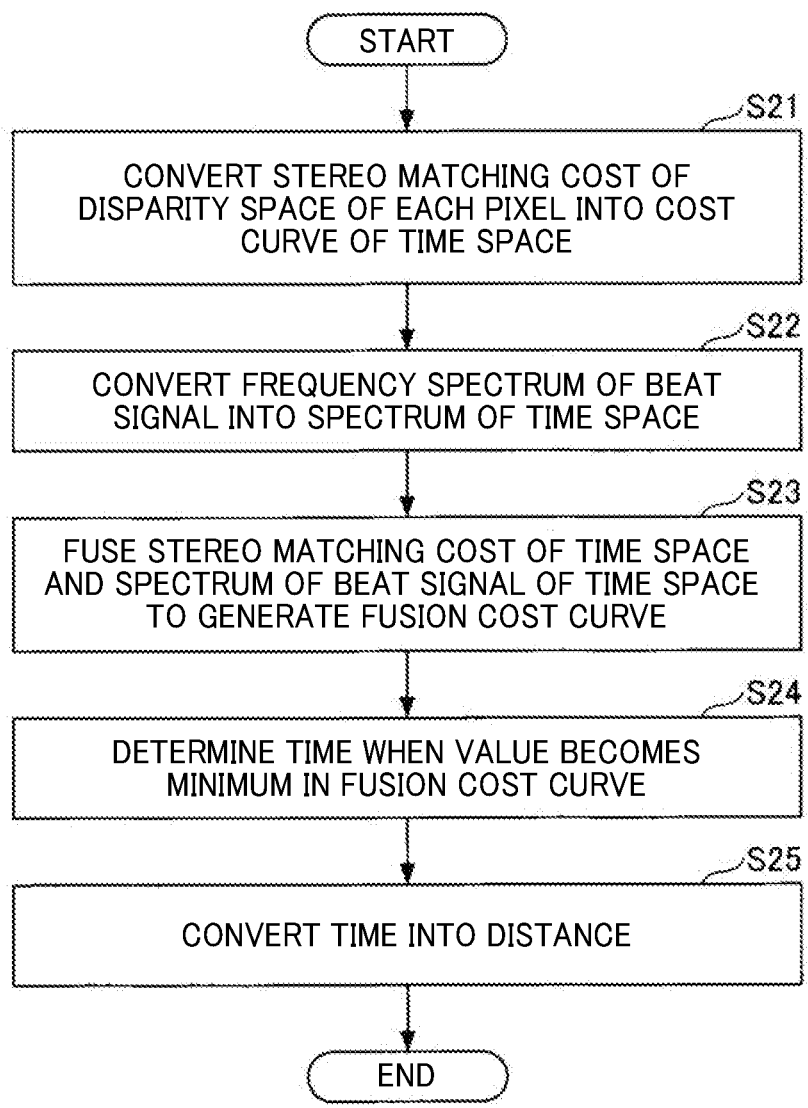

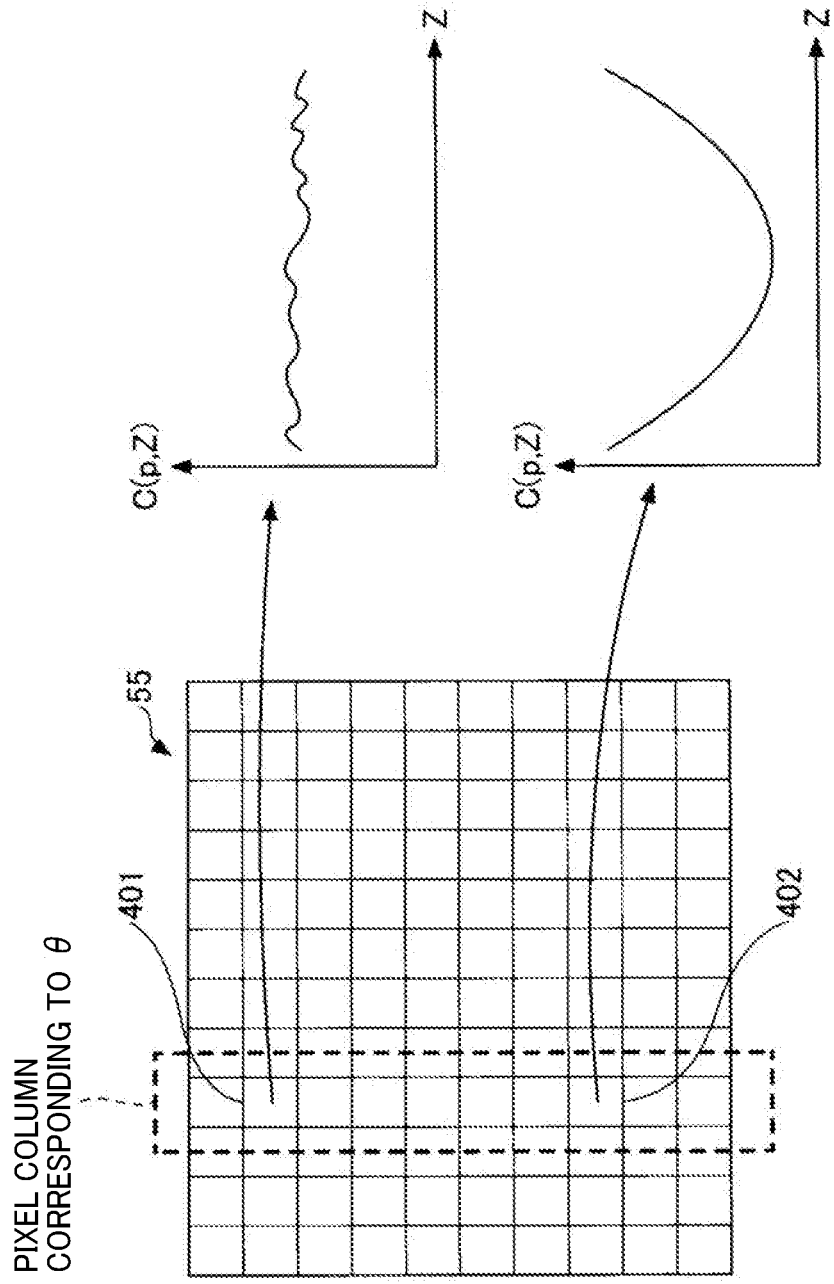

RANGE FINDING METHOD, RANGE FINDING APPARATUS, AND RANGE FINDING SYSTEM

CROSS-REFERENCE TO RELATED APPLICATION

This application claims priority pursuant to 35 U.S.C. § 119(a) to Japanese Patent Application No. 2019-008763, filed on Jan. 22, 2019 in the Japan Patent Office, the disclosure of which is incorporated by reference herein in its entirety.

BACKGROUND

Technical Field

This disclosure relates to a range finding method, a range finding apparatus, and a range finding system.

Background Art

Stereo cameras capture two image data for one scene, and calculate disparity of each pixel of the two image data using the disparity computation algorithm. As to the disparity computation algorithm, a disparity space is searched to obtain a specific disparity that becomes the minimum cost in the disparity space as an integer disparity "d," the sub-pixel is estimated from the integer disparity "d," and the integer disparity value "d" and the sub-pixel disparity value are obtained as the disparity estimation value "D." Then a distance for each pixel is calculated using a formula of "Z=BF/D" that defines a relation of disparity estimation value "D" and distance "Z," in which "B" represents the baseline length, and "F" represents the focal length. However, when the cost is calculated in the disparity space, it is difficult to obtain a good enough distance resolution at a far distant region where the disparity estimation value "D" becomes smaller (or distance "Z" becomes longer), and further, fluctuation or variance in the disparity calculation result greatly affects fluctuation or variance in the measured distance.

Further, the stereo cameras have been applied to various industries, such as automobile industry. In the automobile industry, improvement in the range finding performance is demanded especially in the far distance with the development in autonomous driving.

As disclosed in a reference "Hern'n Badino, et al. Integrating LIDAR into Stereo for Fast and Improved Disclosure Computation, China, 2011 International Conference on 3D Imaging, Modeling, Processing, Visualization and Transmission, 16 May 2011," there is an attempt to fuse a range finding value measured by a stereo camera having higher spatial resolution and lower distance resolution, and a range finding value measured by a system having lower spatial resolution and higher distance resolution obtained by using the time-of-flight (TOF) system, such as the light detection and ranging or laser imaging detection and ranging (LIDAR), or obtained by a millimeter wave radar or sonar using a fast chirp modulation (FCM) and a frequency modulation continuous wave (FMCW). For example, a method that can increase the density of disparity image in a region having less texture using the distance information obtained by the LIDAR is proposed in the above-mentioned reference.

However, the technique disclosed in the above-mentioned reference may have some issues on how to fuse or combine advantages of the respective range finding methods. In conventional fusing methods, after the stereo camera outputs a distance image by performing the block matching, distance information obtained by using the LIDAR, FCM or FMCW method is added. In this fusing method, since the distance image at a far distance location captured by the stereo camera suffers from greater errors, even if the distance information obtained by the LIDAR, FCM or FMCW method is fused with the distance image obtained by the stereo camera, improvement in range finding precision may be limited.

As to conventional fusing method, combination of the stereo camera having higher spatial resolution and lower distance resolution and the system having lower spatial resolution and higher distance resolution, such as the LIDAR, FCM or FMCW, may not be so effective.

SUMMARY

As one aspect of the present disclosure, a method of finding a range to a target object is devised. The method includes extracting a signal component from a beat signal obtained by synthesizing a transmission wave irradiated onto the target object and a reflection wave reflected and received from the target object, generating a matching evaluation value of a plurality of image data of the target object captured by an imaging device, fusing the signal component and the matching evaluation value before generating a distance image from the matching evaluation value, and setting distance information for each pixel of the image data of the target object based on the signal component and the matching evaluation value fused together to generate a distance image.

As another aspect of the present disclosure, a range finding apparatus is devised. The range finding apparatus includes circuitry configured to extract a signal component from a beat signal obtained by synthesizing a transmission wave irradiated onto a target object and a reflection wave reflected and received from the target object, generate a matching evaluation value of a plurality of image data of the target object captured by an imaging device, fuse the signal component and the matching evaluation value before generating a distance image from the matching evaluation value, and set distance information for each pixel of the image data of the target object based on the signal component and the matching evaluation value fused together to generate the distance image.

As another aspect of the present disclosure, a range finding system is devised. The range finding system includes a range finding device configured to emit a transmission wave to a target object and receive a reflection wave returned from the target object, an imaging device configured to capture a plurality of image data of the target object; and circuitry configured to extract a signal component from a beat signal obtained by synthesizing a transmission wave irradiated onto a target object and a reflection wave reflected and received from the target object, generate a matching evaluation value of a plurality of image data of the target object captured by an imaging device, fuse the signal component and the matching evaluation value before generating a distance image from the matching evaluation value, and set distance information for each pixel of the image data of the target object based on the signal component and the matching evaluation value fused together to generate the distance image.

BRIEF DESCRIPTION OF THE DRAWINGS

A more complete appreciation of the description and many of the attendant advantages and features thereof can be readily acquired and understood from the following detailed description with reference to the accompanying drawings, wherein:

FIG. 3 illustrates an example of a change of frequency of a transmission wave and a change of frequency a reception wave and a waveform of a beat signal over time when a frequency modulation continuous wave (FMCW) method is applied;

FIGS. 10B-1 and 10B-2 respectively illustrate a reference image and a comparative image captured by a stereo camera;

FIG. 11A illustrates a method of generating a stereo image using two cameras;

FIG. 11B illustrates a method of generating a stereo image using a single lens camera;

FIG. 19 is a flowchart illustrating a procedure for fusing a distance obtained from a disparity image and a distance detected by performing a fast chirp modulation (FCM) method using a data fusion unit;

FIG. 22 is an example flowchart illustrating a procedure for fusing a stereo matching cost of a disparity image and a frequency spectrum according to the second embodiment;

FIG. 26 is an example flowchart illustrating a procedure for fusing stereo matching cost of disparity image and spectrum of beat signal in a time space according to the third embodiment;

FIG. 34 schematically illustrates image data, irradiation positions of millimeter wave, and stereo matching cost according to a sixth embodiment;

Figure 1:
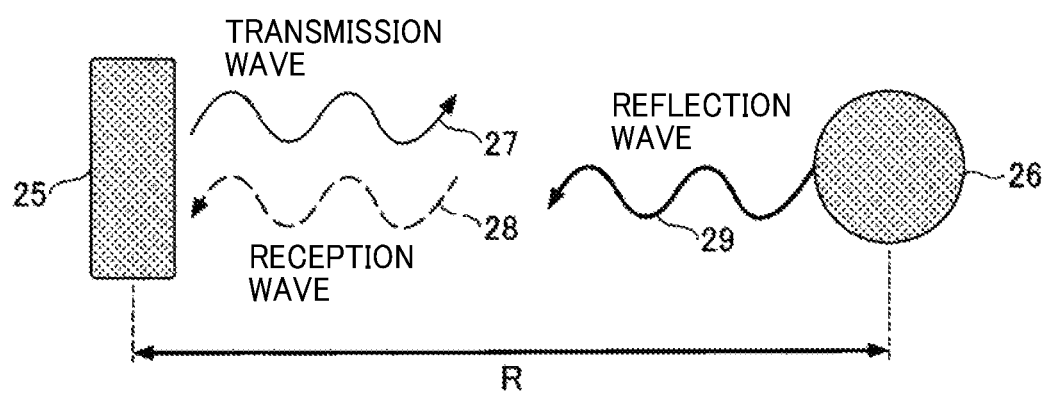
FIG. 1 illustrates a model of a transmission wave, a reception wave, and a reflection wave used by a millimeter wave transmission-reception device for finding a distance to a target object.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

A description is now given of exemplary embodiments of the present disclosures. It should be noted that although such terms as first, second, etc., may be used herein to describe various elements, components, regions, layers and/or units, it should be understood that such elements, components, regions, layers and/or units are not limited thereby because such terms are relative, that is, used only to distinguish one element, component, region, layer or unit from another region, layer or unit. Thus, for example, a first element, component, region, layer or unit discussed below could be termed a second element, component, region, layer or unit without departing from the teachings of the present disclosures.

In addition, it should be noted that the terminology used herein is for the purpose of describing particular embodiments only and is not intended to be limiting of the present disclosures. Thus, for example, as used herein, the singular forms "a", "an" and "the" are intended to include the plural forms as well, unless the context clearly indicates otherwise. Moreover, the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Hereinafter, a description is given of one or more embodiments of this disclosure with reference to the drawings.

(Terms)

Hereinafter, a description is given of terms used in this description. An operation of searching corresponding points in data such as image data is referred to as "matching," and a degree of matching is referred to as "cost." The cost represents an "evaluation value" of the degree of matching, and can also be expressed as "dissimilarity level" or "similarity level." The smaller the "dissimilarity level," the higher the degree of matching, and the higher the "similarity level," the higher the degree of matching, which are used as an indicator indicating the degree of matching. The "dissimilarity level" and "similarity level" can be collectively referred to as "degree of matching" or "matching level" in this description.

A distance resolution is a capability of identifying a difference in distance to a target object. If the distance resolution in the Z direction is, for example, 10 cm, one target object at 12 cm from the reference point and another target object at 21 cm from the reference point (i.e., distance difference is 9 cm) cannot be distinguished, in which the one target object and another target object are determined as the same target object (the same distance).

A spatial resolution is a capability of identifying a difference in distance in any direction in a two dimensional space. For example, if a spatial resolution is 5 cm on the X-Y plane and two objects are spaced apart by 4 cm, the two objects cannot be identified as different objects but determined as the same object. The spatial resolution can also be referred to as angular resolution.

A matching evaluation value represents the degree of matching used for the block matching. In this description, the matching evaluation value is described using a term of "stereo matching cost."

In this description, a fusion means an integration of a plurality of things, such as range finding values measured by different systems or devices, into one. The fusion may be also referred to as integration.

(Conventional Method)

As described above, the fusion of the range finding value measured by the stereo camera and the range finding value measured by the LIDAR, FCM or FMCW method has been researched and developed. As to the time-of-flight (ToF) system (e.g., LIDAR) that receives a reflection wave reflecting from a target object as a reception wave to measure a distance to the target object, in which the light amount of the reception wave is smaller (weaker), causing difficulty to detect the range or distance to a far distant target object or a low reflectance target object.

Therefore, the fusion of the range finding value measured by the stereo camera and the range finding value measured by the FCM and FMCW method has been researched and developed. The FCM or FMCW method converts a frequency of beat signal (stray signal) of a synthesized wave, which is generated from the transmission wave and the reception wave (reflected wave) having a slight difference of frequencies, into a distance.

However, as to the FCM and FMCW methods, noise component, such as interference of the sun light and/or transmission wave coming from other vehicles, may be included in the reflection wave. In this situation, the noise appears in the frequency spectrum, obtained by performing the Fourier transform to the beat signal, causing the deterioration of the range finding precision.

(FCM Method)

Hereinafter, a description is given of the range finding using the FCM method with reference to the drawings for describing an issue on conventional methods.

FIG. 1 schematically illustrates a model of a transmission wave 27, a reception wave 28, and a reflection wave 29 used by a millimeter wave transmission-reception device 25 for finding a range or distance to a target object 26. When the millimeter wave transmission-reception device 25 emits or transmits the transmission wave 27, the transmission wave 27 reflects on the target object 26 as the reflection wave 29, and then the millimeter wave transmission-reception device 25 receives the reflection wave 29 as the reception wave 28. In FIG. 1, a distance between the millimeter wave transmission-reception device 25 and the target object 26 is referred to as distance "R."

Figure 2A:
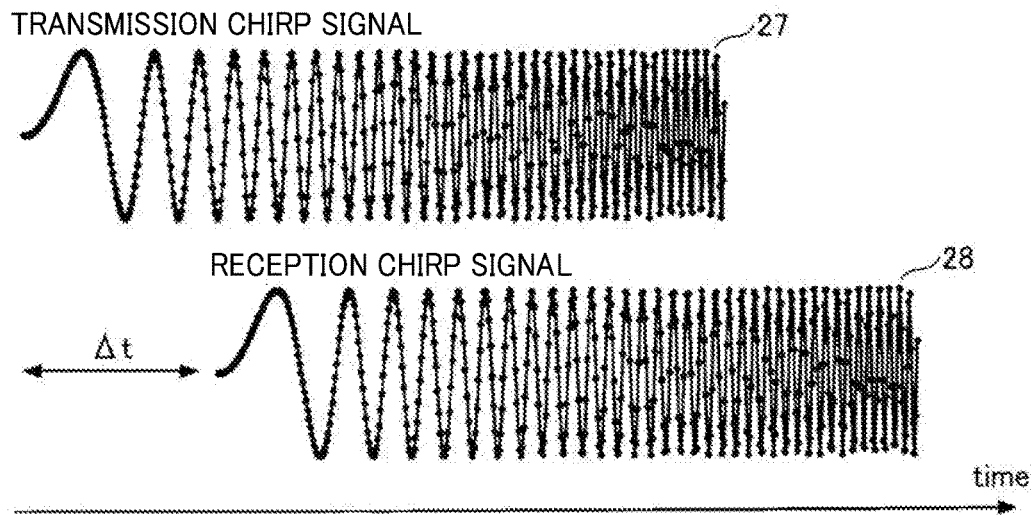
FIGS. 2A, 2B, and 2C schematically illustrate frequency of transmission wave and reception wave.
Figure 2B:
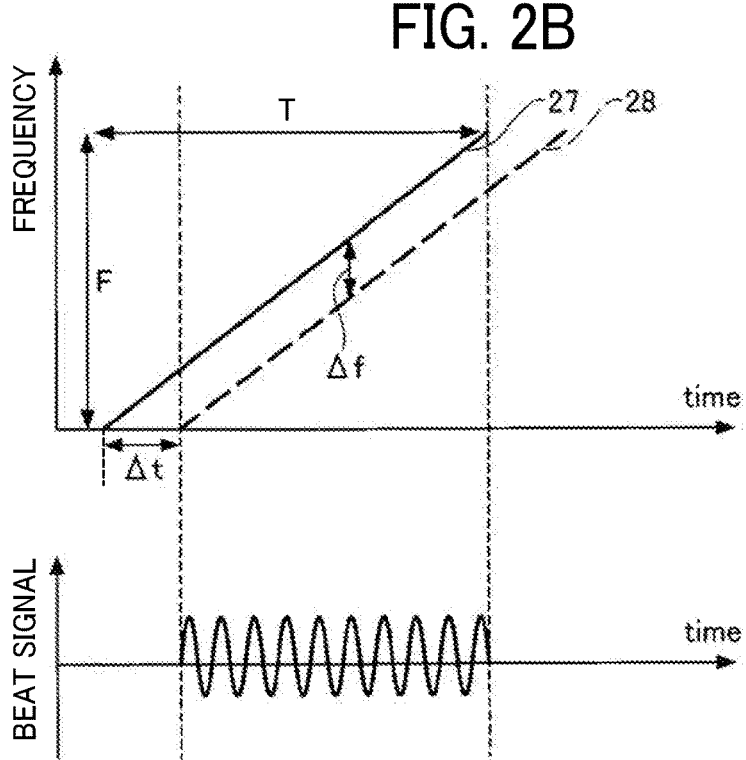
Figure 2C:
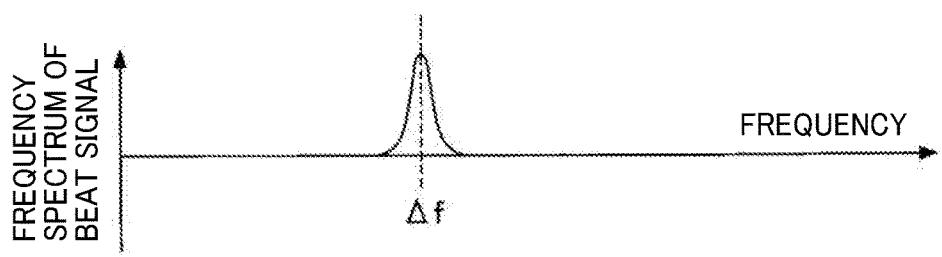

FIGS. 2A, 2B, and 2C schematically illustrate the transmission wave 27 having a frequency and the reception wave 28 having a frequency. The frequency of the transmission wave 27 used for the FCM method increases linearly over time. A signal whose frequency changes over time is referred to as a chirp signal. As illustrated in FIG. 2A, the frequency of the transmission wave 27 and the frequency of the reception wave 28 increase over time while the amplitude of wave is being constant. After emitting the transmission wave 27 from the millimeter wave transmission-reception device 25, the millimeter wave transmission-reception device 25 receives the reception wave 28 reflected from the target object 26 at a time that delays from a time when emitting the transmission wave 27 by a given time period Δt (hereinafter, delay time Δt) that is counted from the emission start time of the transmission wave 27 and the reception time of the reception wave 28. Therefore, the frequency of the transmission wave 27 and the frequency of the reception wave 28 become slightly different, and thereby a beat signal is generated.

FIG. 2B illustrates a change of the transmission wave 27 and the reception wave 28 over time. After the start of emitting the transmission wave 27, the reception wave 28 is received and measured at a time delayed for some time (i.e., delay time Δt). Since the frequency of the transmission wave 27 increases at a constant rate over time, a shift of frequency (hereinafter, frequency shift Δf) is constant in a case when the delay time Δt occurs. The time period that the frequency changes is referred to as the time T," and a frequency difference between the minimum frequency and the maximum frequency is referred to as frequency difference "F." The time "T" and the frequency difference "F" are controllable values, which may be known. Therefore, if the frequency shift Δf can be detected or measured, the frequency shift Δf can be converted into the delay time Δt. If the delay time Δt can be obtained, the delay time Δt can be converted into a distance to the target object 26.

Since the frequency of the transmission wave 27 and the frequency of the reception wave 28 deviate for the frequency shift Δf, a beat signal is generated when the transmission wave 27 and the reception wave 28 are synthesized. The beat signal represents one oscillation including discrete smaller oscillations, in which the frequency of the one oscillation is constant if the frequency shift Δf is constant. Further, it is known that the frequency of beat signal becomes equal to the frequency shift Δf.

When the Fourier transform is performed to the beat signal and a frequency spectrum including a frequency component (an example of signal component) is extracted, a peak having a given power appears in the frequency spectrum of the beat signal so that the frequency shift Δf can be detected by performing the Fourier transform to the beat signal. FIG. 2C schematically illustrates the frequency shift Δf obtained by performing the Fourier transform to the beat signal.

Hereinafter, a method of converting the frequency shift Δf into the distance "R" is described. The distance "R" and the delay time Δt have a following relationship as indicated in a formula (1), in which C is the speed of light in the air.

$$\Delta t = 2R/C \tag{1}$$

The delay time Δt and the frequency shift Δf have a following relationship as indicated in FIG. 2B.

$$\Delta t : \Delta f = T : F$$

Therefore, a following formula (2) is obtained by transforming this relationship.

$$\Delta f = F \times \Delta t / T \tag{2}$$

When the formula (1) is substituted in the formula (2), following formulas (3) and (4) are obtained.

$$\Delta f = 2RF/CT \tag{3}$$

$$R = CT\Delta f / 2F \tag{4}$$

Therefore, the distance "R" can be obtained by substituting the frequency shift Δf, obtained by performing the Fourier transform, in the formula (4).

The FMCW method performs the FCM continuously, and thereby the FMCW method is performed same as the FCM method. FIG. 3 illustrates a change of frequency of the transmission wave 27 and a change of frequency of the reception wave 28 and a waveform 24 of beat signal over time when the FMCW method is applied. When the FMCW method is applied, the frequency repeatedly changes relatively slower. Compared to the FMCW method, the FCM method can perform a higher recognition of relative speed and multiple targets.

Figure 4:
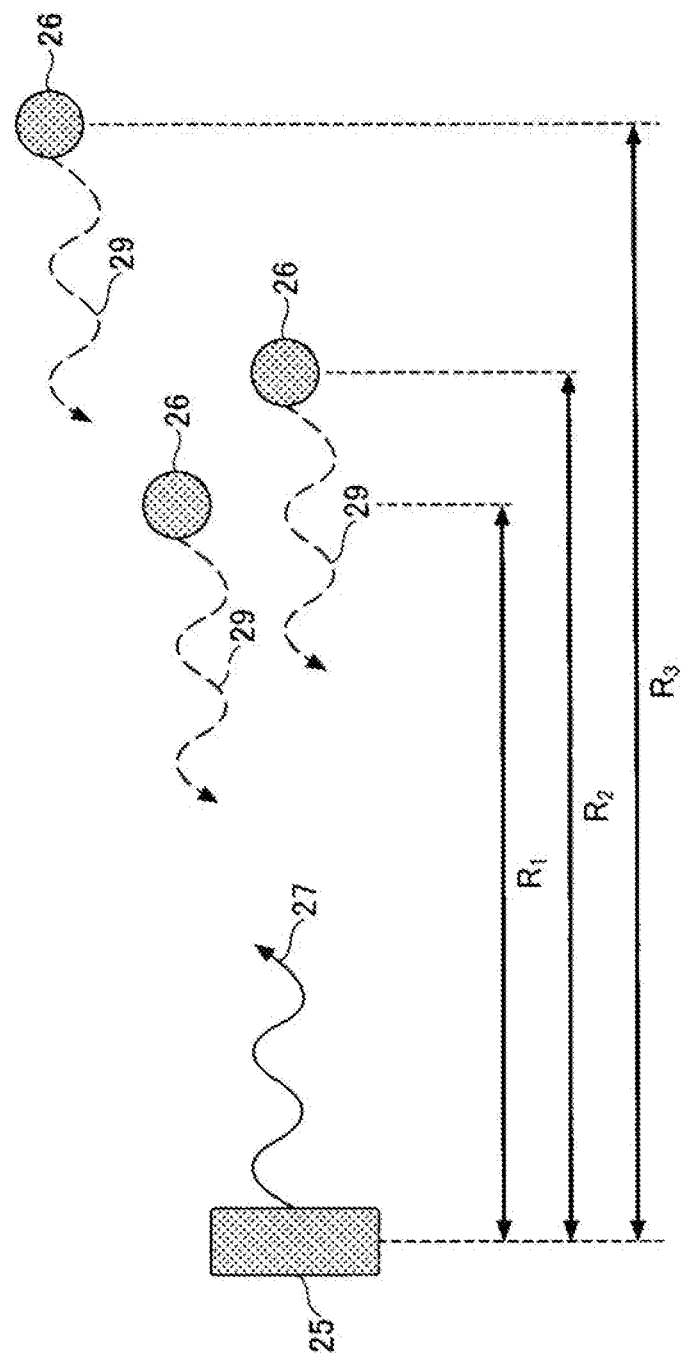
FIG. 4 illustrates a model of a transmission wave and a reflection wave when a plurality of target objects exists in one direction.

Hereinafter, a description is given of a case when a plurality of target objects exists in one direction with reference to FIG. 4. FIG. 4 illustrates a model of the transmission wave 27 and the reflection wave 29 when a plurality of target objects 26 exists in one direction. In an example case of FIG. 4, three target objects 26 exist in one direction, in which the distance between the millimeter wave transmission-reception device 25 and the three target objects 26 is set "R1, R2 and R3," respectively. In this example case, the frequency shift Δf (Δf1, Δf2, Δf3), respectively corresponding to the distances "R1, R2 and R3," can be observed.

Figure 5A:
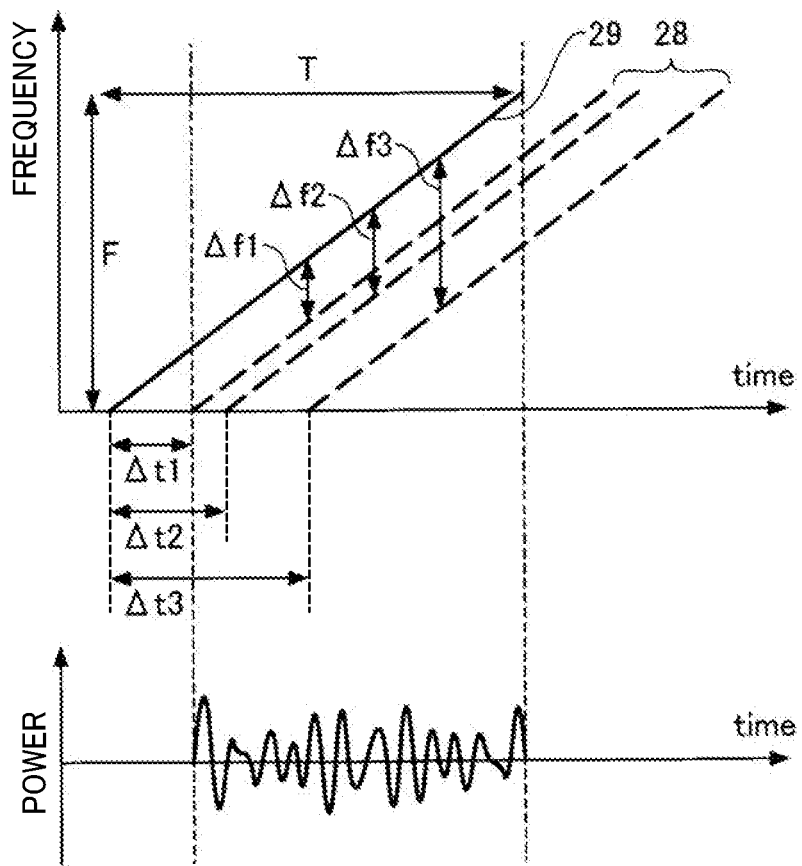
FIG. 5A illustrates a shift between frequency of a transmission wave and frequency of a reception wave when three target objects exist.

FIG. 5A illustrates a shift between the frequency of the transmission wave 27 and the frequency of the reception wave 28 when the three target objects 26 exist in one direction. Since the distances "R1, R2 and R3" are different for each of the three target objects 26, the delay time Δt1, Δt2 and Δt3 when the reception wave 28 is received after emitting the transmission wave 27 are also different for each of the three target objects 26. Therefore, the frequency shifts Δf1, Δf2, and Δf3 between the transmission wave 27 and the respective three reception waves 28 also occur for each of the three target objects 26.

Figure 5B:
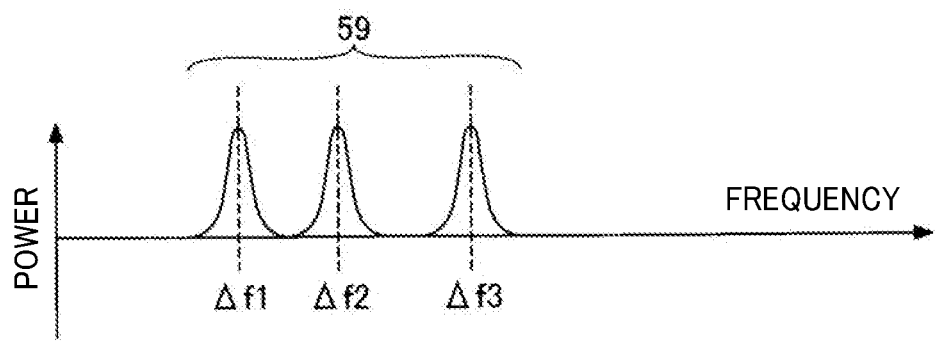
FIG. 5B illustrates a peak of power obtained at respective frequency shifts.

Since the beat signal, obtained by synthesizing the transmission wave 27 and the reception wave 28, includes the three frequency shift Δf1, Δf2, and Δf3, the beat signal becomes a complex shape but the frequency shifts Δf1, Δf2, and Δf3 can be extracted as the signal component easily by performing the Fourier transform. As illustrated in FIG. 5B, by performing the Fourier transform to the beat signal, a peak 59 having a given power can be obtained at each of the frequency shifts Δf1, Δf2, and Δf3.

Then, the distance "Rk" (k: 1, 2, 3) to each of the three target objects 26 can be obtained using a following formula (5) and the frequency shifts Δf1, Δf2 and Δf3 as similar to the formula (4).

$$Rk = CT\Delta fk / 2F \tag{5}$$

When the range finding is performed in an actual situation, the frequency shifts Δf1, Δf2 and Δf3 are determined from the frequency spectrum obtained by performing the Fourier transform to the beat signal, but it is not known which frequency corresponds to the frequency shifts Δf1, Δf2 and Δf3 at a time when the Fourier transform is performed. Therefore, a frequency having a power equal to or greater than a given threshold value is set as the frequency shift Δf.

However, if a noise occurs to the reception wave 28 due to some factors, such as interference of the sun light or the transmission wave 27 coming from other vehicles, a noise peak appears in the frequency spectrum obtained by preforming the Fourier transform to the beat signal.

Figure 6:
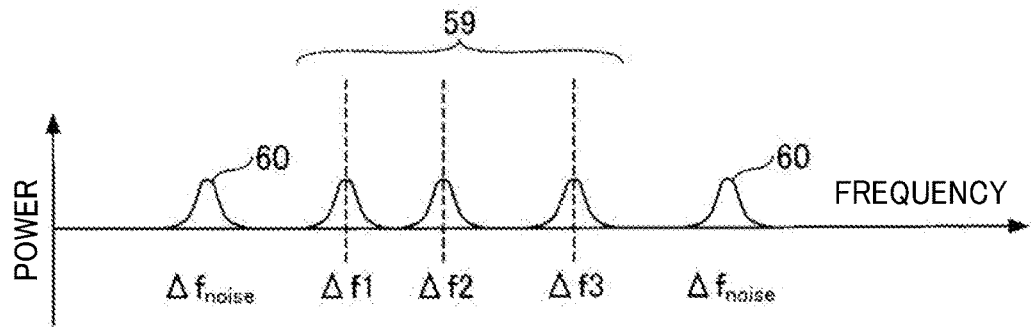
FIG. 6 schematically illustrates a frequency spectrum including a noise.

FIG. 6 schematically illustrates a frequency spectrum including the noise. In an example case in FIG. 6, in addition to the peak 59 corresponding to the frequency shifts Δf1, Δf2 and Δf3 generated by the reception wave 28 reflected and received from the target object 26, two peaks 60 caused by the noise (see Δfnoise in FIG. 6) appear in the frequency spectrum. However, at this stage, the millimeter wave transmission-reception device 25 cannot determine which peak corresponds to the frequency shift and which peak corresponds to the noise. If the noise has the power equal to or greater than a threshold value, the millimeter wave transmission-reception device 25 may detect the peak 60 as the frequency shift, causing lower precision of the range finding (distance measurement) to the target object 26 and finding the number of the target objects 26.

First Embodiment

Hereinafter, a description is given of a range finding system that can improve the range finding precision by fusing a range finding value measured by the stereo camera and a range finding value by measured the FCM method in view of the above described issues with reference to FIG. 6. At first, a range finding system of a first embodiment is described.

The overall procedure can be performed as follows. Since the distance can be calculated for each pixel based on the disparity value of each pixel, the frequency shift Δf can be estimated using the formula (4). As to the frequency spectrum, since it can be assumed that a peak exists near the frequency shift Δf, the range finding system detects the peak of the frequency spectrum near the estimated frequency shift Δf That is, the frequency range is limited in the frequency spectrum obtained by performing the Fourier transform to the beat signal. With this processing, the probability of detecting erroneously the noise as a peak related to the target object 26 can be reduced, and the deterioration of detection precision of the number of target objects and distance to each of the target objects can be reduced, and thereby the precision of range finding or distance measuring to the target object can be improved.

Further, as to the first embodiment, by performing the fusion of the range finding value measured by the stereo camera and the range finding value measured by the FCM method before generating the distance image from the range finding value measured by the stereo camera, a distance image having a smaller dispersion for the range finding value and higher spatial resolution can be obtained even if the target object is at a far distance position.

(Application of Range finding System)

Figure 7:
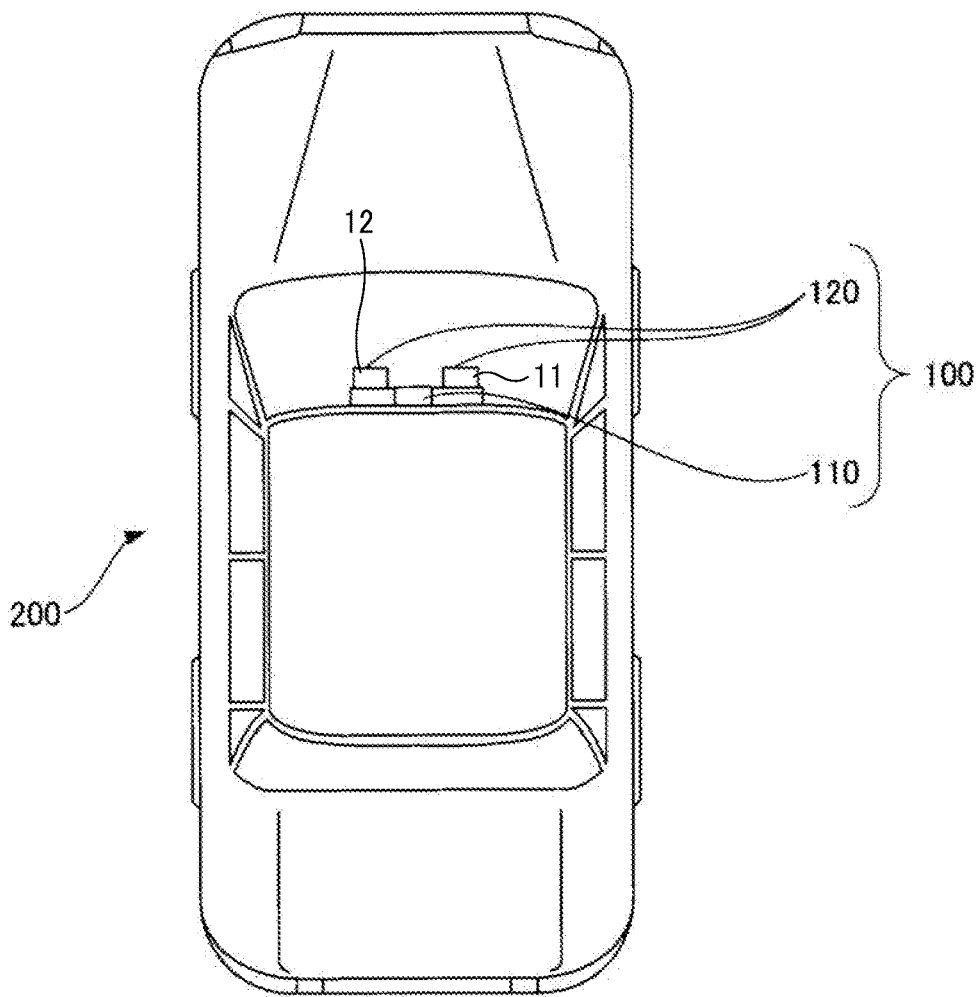
FIG. 7 illustrates an example of a range finding system mounted on a vehicle used as an example of a movable apparatus.

Hereinafter, a description is given of an example of an application of a range finding system 100 with reference to FIG. 7. FIG. 7 illustrates the range finding system 100 mounted on a vehicle, used as an example of a movable apparatus 200 in this description. In an example case of FIG. 7, the range finding system 100 is mounted or attached inside the vehicle at a center position of a front window of the vehicle (movable apparatus 200). The range finding system 100 includes, for example, a radar ranging device 110 (used as a range detection device) and a stereo image generation device 120 (used as an imaging device). Since the range finding system 100 is used to measure the range or distance to the target object, the range finding system 100 can be also referred to as a range finding apparatus. Both of the radar ranging device 110 and the stereo image generation device 120 are installed at given positions so that the forward direction of the movable apparatus 200 becomes an area of the range finding for both of the radar ranging device 110 and the stereo image generation device 120. It is assumed that the radar ranging device 110 is disposed between two imaging units of the stereo camera included in the stereo image generation device 120, preferably at the center between the two imaging units of the stereo camera. The radar ranging device 110 measures the distance and direction to the target object using the above described FCM method.

In an example case of FIG. 7, the radar ranging device 110 and the stereo image generation device 120 are configured as one device, but the radar ranging device 110 and the stereo image generation device 120 can be configured as separated devices.

Figure 8:
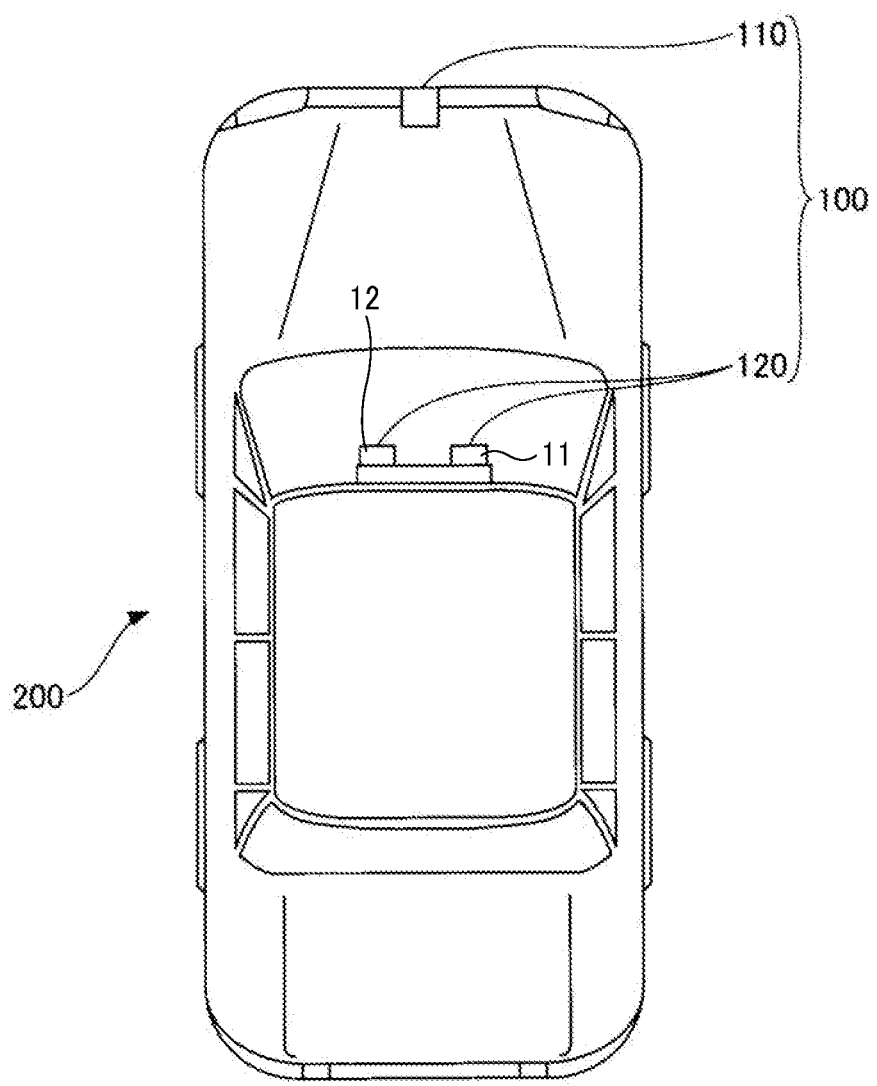
FIG. 8 illustrates another example of a range finding system mounted on a vehicle, in which a radar ranging device and a stereo image generation device are disposed as separated devices.

FIG. 8 illustrates another example of the range finding system 100, in which the radar ranging device 110 and the stereo image generation device 120 are disposed as separated devices. In another configuration of FIG. 8, the radar ranging device 110 is mounted on an inside of a front grill of the vehicle while the stereo image generation device 120 is disposed at a front side of an interior compartment of the vehicle (e.g., near the rear view mirror). In the first embodiment, the configuration are not limited to the configurations of FIGS. 7 and 8 as long as the range finding value (distance information) output from the radar ranging device 110 can be fused with the range finding value (distance information) obtained by the stereo image generation device 120.

(Irradiation Range of Radar Ranging Device)

Figure 9A:
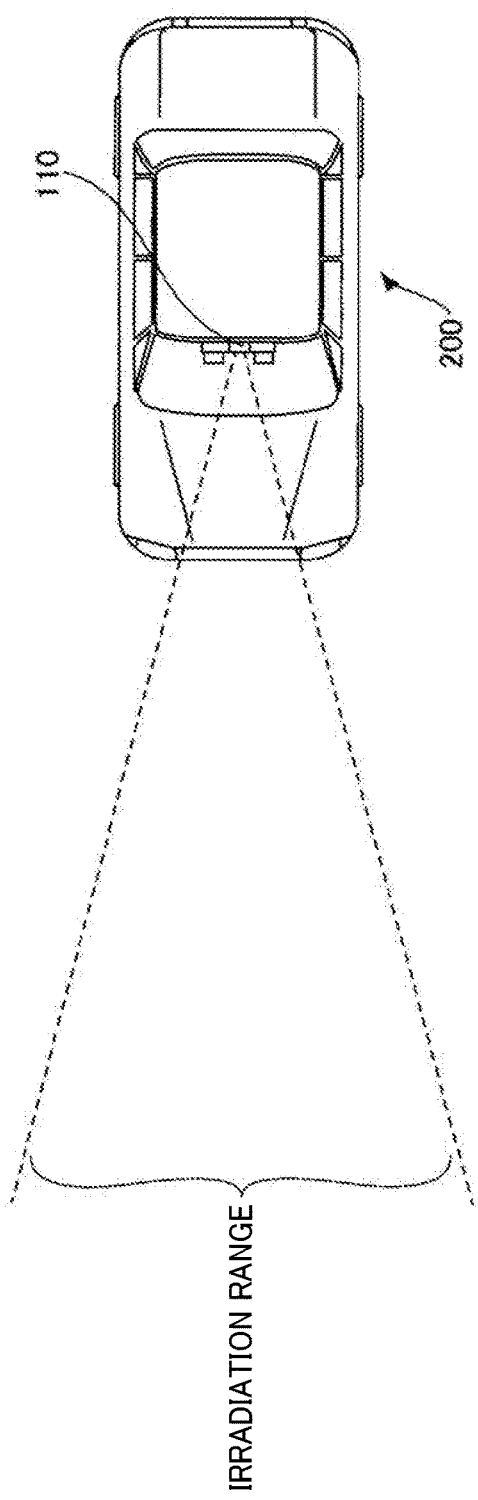
FIGS. 9A and 9B illustrate an example of an irradiation range of millimeter wave by a radar ranging device.

Hereinafter, a description is given of an irradiation range of millimeter wave irradiated or emitted from the radar ranging device 110 with reference to FIG. 9. FIG. 9A is an example of a diagram illustrating a top view of the movable apparatus 200 viewed from above, and FIG. 9B is an example of a diagram illustrating a side view of the movable apparatus 200 viewed from a left side.

As illustrated in FIG. 9A, the radar ranging device 110 irradiates, for example, millimeter wave toward a given range in a forward direction of a traveling direction of the movable apparatus 200. The millimeter wave is one type of wave of radar (light) or electromagnetic wave.

Figure 9B:
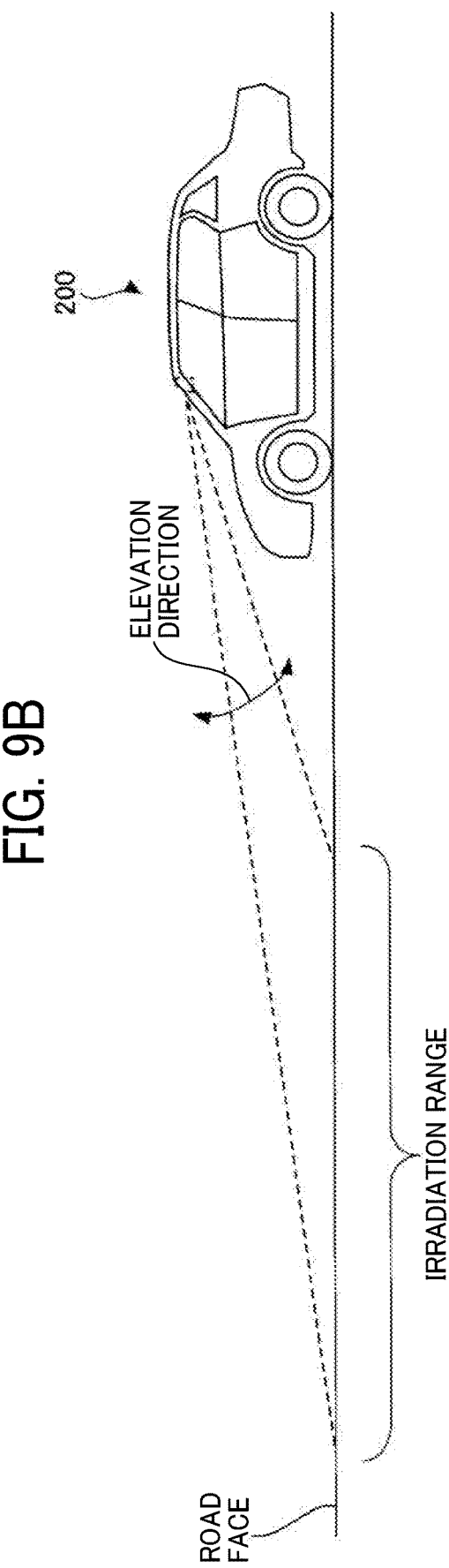

Further, as illustrated in FIG. 9B, the radar ranging device 110 irradiates the millimeter wave toward a given range in the forward direction of the traveling direction of the movable apparatus 200. The maximum distance that the millimeter wave can reach depends on an output power of the radar ranging device 110. For example, the range finding can be performed within a range of several hundred meters. The minimum detection range at the near side can be less than one meter. However, since the necessity of range finding is generally low in such a closer range, the range used for detecting the distance can be set appropriately.

Further, as illustrated in FIG. 9B, the radar ranging device 110 irradiates the millimeter wave by setting a given directivity along the elevation direction. With this configuration, the radar ranging device 110 can irradiate the millimeter wave to the irradiation range, which is from near to far sides with respect to an installation position of the radar ranging device 110 used as the reference position.

(Image Capture Range of Stereo Image Generation Device)

Figure 10A:
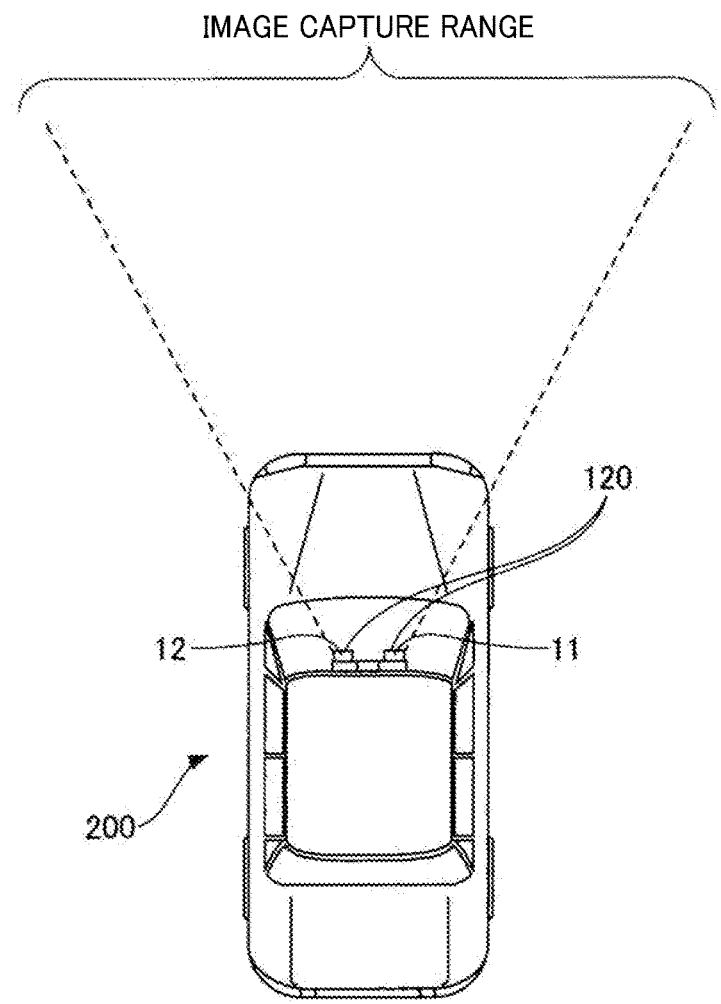
FIG. 10A is a diagram illustrating an image capture range of a stereo image captured by a stereo image generation device.

Hereinafter, a description is given of an image capture range of a stereo image captured by the stereo image generation device 120 with reference to FIG. 10. FIG. 10A is a top view of the movable apparatus 200. The stereo image generation device 120 has two imaging units (two cameras) by aligning optical axes of the two imaging units along the forward direction of the traveling direction of the movable apparatus 200, with which images within a given range in the traveling direction are captured using the two imaging units (two cameras). The irradiation range of the millimeter wave and the image capture range of the stereo camera overlap at least partially with each other.

Figures 1, 10B:
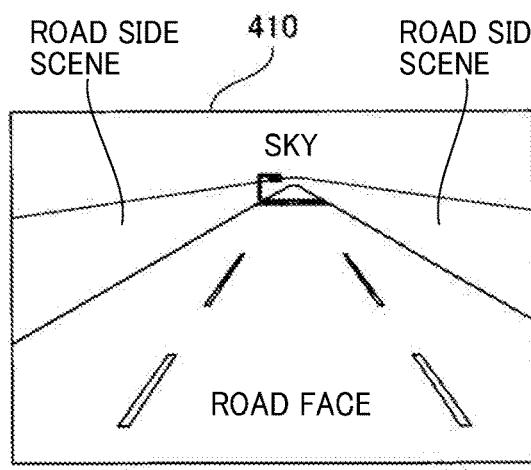
Figures 2, 10B:
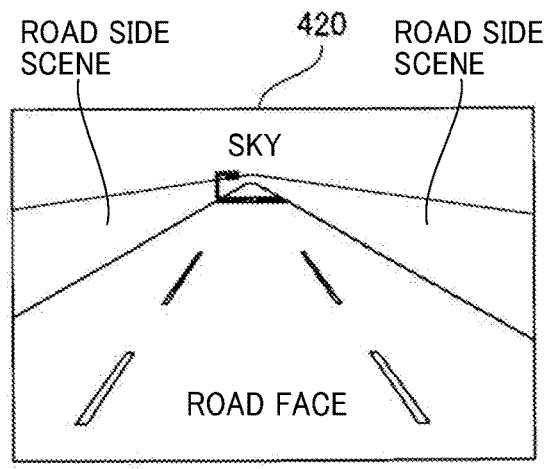

FIGS. 10B-1 and 10B-2 illustrate images captured by the stereo camera, such as a reference image (image data captured by the right camera 11) and a comparative image (image data captured by the left camera 12). The right camera 11 and the left camera 12 are arranged side-by-side along the horizontal direction by setting a given interval therebetween. Therefore, the reference image and the comparative image have an overlapping portion while a position of a target object deviates along the left-to-right direction in the captured reference image and the captured comparative image.

The stereo image generation device 120 calculates a deviation amount (i.e., disparity) between the reference image and the comparative image of the target object to generate and output a distance image.

Further, any one of the right camera 11 and the left camera 12 can be omitted, in which a stereo image can be obtained using one single lens camera. Hereinafter, a description is given of a method of generating a stereo image using one or more single lens cameras with reference to FIG. 11.

As illustrated in FIG. 11A, the stereo image generation device 120 includes, for example, the right camera 11 and the left camera 12. At first, a greater number of reference images and comparative images are prepared, and then a deep learning is performed to learn the comparative images from the reference images, or the reference images from the comparative images. In the following description, the deep learning is performed to learn the comparative images from the reference images.

A deep neural network (DNN) 121 includes an input layer, an intermediate layer (hidden layer), and an output layer. Each pixel value of the reference image is input to the input layer of the DNN 121. The intermediate layer includes one or more convolutional layers, one or more pooling layers, a neural network, and an encoder decoder network. These are expressed as coefficients of a two-dimensional filter. The output layer outputs each pixel value of the to-be-estimated comparative image. A difference between the pixel value output by the output layer and the pixel value of the actual comparative image is reflected to (learned to) the coefficient of the two-dimensional filter by performing the error inverse propagation method. The DNN 121 performs the deep learning by adjusting the coefficients of two-dimensional filter using sufficient number of reference images and comparative images. The initial value of the two-dimensional filter can be learned using an autoencoder.

FIG. 11B illustrates an example of a single lens camera processing unit 122 and the DNN 121, which are mounted to a vehicle after the learning. After mounting the single lens camera processing unit 122 and the DNN 121 on the vehicle, the single lens camera processing unit 122 outputs the reference image alone. The DNN 121 is used as output means that outputs the comparative image. The reference image is input to the DNN 121 and then the DNN 121 outputs an estimated comparative image. Although the comparative image obtained in this manner (FIG. 11B) is different from the comparative image captured by the left camera 12 (FIG. 11A), it has been confirmed that the estimated comparative has a quality that can generate a distance image. Then, the single lens camera processing unit 122 performs the block matching on the reference image and the estimated comparative image.

Therefore, in the first embodiment, at least any one of the right camera 11 and the left camera 12 is required, and the mounting of the stereo camera may not be required.
(Configuration of Range Finding System)

Figure 12:
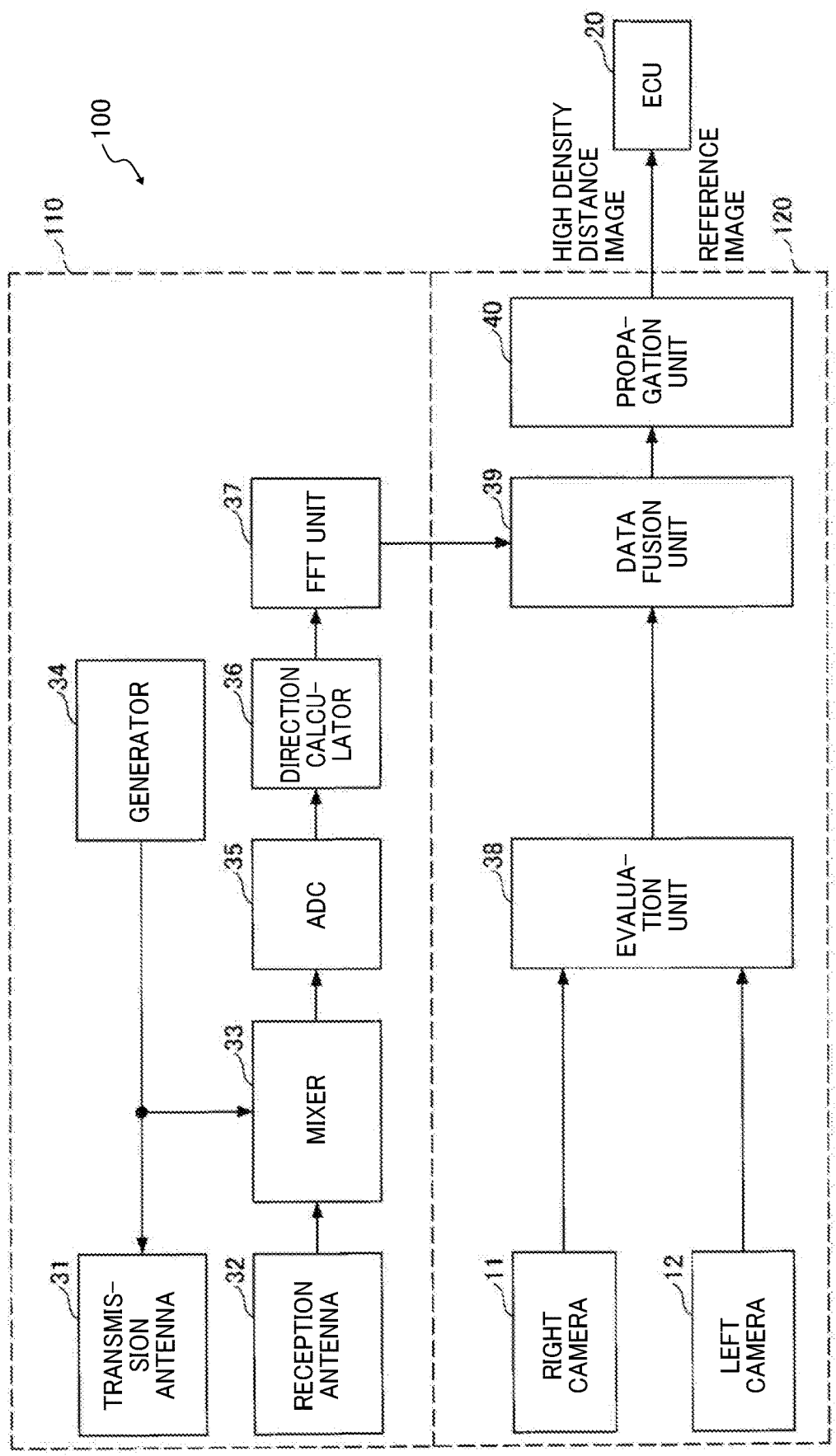
FIG. 12 is an example of a schematic diagram of a range finding system.

FIG. 12 illustrates a schematic configuration of the range finding system 100. As illustrated in FIG. 12, the range finding system 100 includes, for example, the radar ranging device 110 and the stereo image generation device 120. The radar ranging device 110 includes, for example, a transmission antenna 31, a reception antenna 32, a generator 34, a mixer 33, an analog digital converter (ADC) 35, a direction calculator 36, and a fast Fourier transform (FFT) unit 37.

The generator 34 generates chirp signals repeatedly. The generator 34 can employ a direct digital synthesizer (DDS) technology using a digital signal processor (DSP) and a digital-analog (DA) converter to generate digital chirp signals, or can use an analog circuit to generate digital chirp signals by providing control signals that changes linearly to a voltage-controlled oscillator (VCO).

The transmission wave generated by the generator 34 is distributed to the transmission antenna 31 and the mixer 33, and then emitted from the transmission antenna 31. The reception antenna 32 receives the reflection wave (chirp signal) reflected from the target object and transmits the received reflection wave to the mixer 33.

The mixer 33 combines or synthesizes the transmission wave and the reception wave to generate a synthesized wave. The synthesized wave includes a beat signal (stray signal). The ADC 35 performs the AD conversion to the synthesized wave to convert the synthesized wave into a digital synthesized wave. The FFT unit 37 performs the Fourier transform to the digital synthesized wave to generate a frequency spectrum of the synthesized wave.

As illustrated in FIG. 12, the stereo image generation device 120 includes, for example, the right camera 11, the left camera 12, an evaluation unit 38, a data fusion unit 39 and a propagation unit 40. The reference image captured by the right camera 11 and the comparative image captured by the left camera 12 are output to the evaluation unit 38. The evaluation unit 38 performs the block matching to the reference image and the comparative image to generate a disparity image based on the disparity calculated for each pixel.

The data fusion unit 39 converts the disparity of the disparity image into the distance, limits a frequency range of beat signal to be extracted from the frequency spectrum, and determines the frequency shift $\Delta f$ having a power of the local maximum value from the limited frequency range. Then, the data fusion unit 39 calculates the distance "R" based on the frequency shift $\Delta f$ using the above formula (4). The data fusion unit 39 fuses the distance "R" (precisely, distance "L2" converted into the coordinate system of the stereo image generation device 120) and distance "L1" that is converted from the disparity of each pixel, and then stores the fused distance to the distance image. The fusion method will be described later.

The propagation unit 40 generates a high-density distance image by applying a dense algorithm, such as semi-global matching (SGM) propagation method, to the distance image.

In an example case of FIG. 12, the propagation unit 40 outputs or transmits the distance image and the reference image to an electronic control unit (ECU) 20, in which the propagation unit 40 is used as an output unit. The ECU 20 is an electronic control unit used for controlling the movable apparatus 200. The range finding system 100 mounted on the movable apparatus 200, such as vehicle, may be referred to as a vehicle-mounted apparatus in this description. The ECU 20 performs various drive assistance operations using the distance image and the reference image output from the range finding system 100. The ECU 20 performs various pattern matching to the reference images to recognize a state of preceding vehicle, pedestrians, white lines, traffic signals, or the like.

The drive assistance operation varies depending on the movable apparatus. For example, the warning and braking are performed in accordance with the time-to-collision (TTC) calculated from the distance and the relative speed when a side position of the target object overlaps with the apparatus width of the movable apparatus. Further, if it is difficult to stop the movable apparatus (e.g., vehicle) to evade the collision, the ECU 20 controls the steering in a direction that can evade the collision.

Further, the ECU 20 controls vehicle-to-vehicle distance to drive the vehicle by following the preceding vehicle by keeping the vehicle-to-vehicle distance based on the vehicle speed. For example, when the preceding vehicle stops, the ECU 20 stops the movable apparatus, and when the preceding car starts to move, the ECU 20 starts to move the movable apparatus. Further, when the ECU 20 performs a white line recognition, the ECU 20 can perform a lane keeping control to make the movable apparatus running on the center of the lane, and a deviation prevention control to change the traveling direction to the running lane when the movable apparatus is to deviate from the running lane.

Further, when an obstacle exists in the traveling direction when the movable apparatus is being stopped, the ECU 20 can prevent the sudden start of the movable apparatus. For example, if the obstacle exists in the traveling direction of the movable apparatus determined by an operation position of the shift lever and the operation amount of the accelerator pedal is greater, the ECU 20 restricts the engine output and outputs the warning to reduce or prevent damages.

Figure 13:
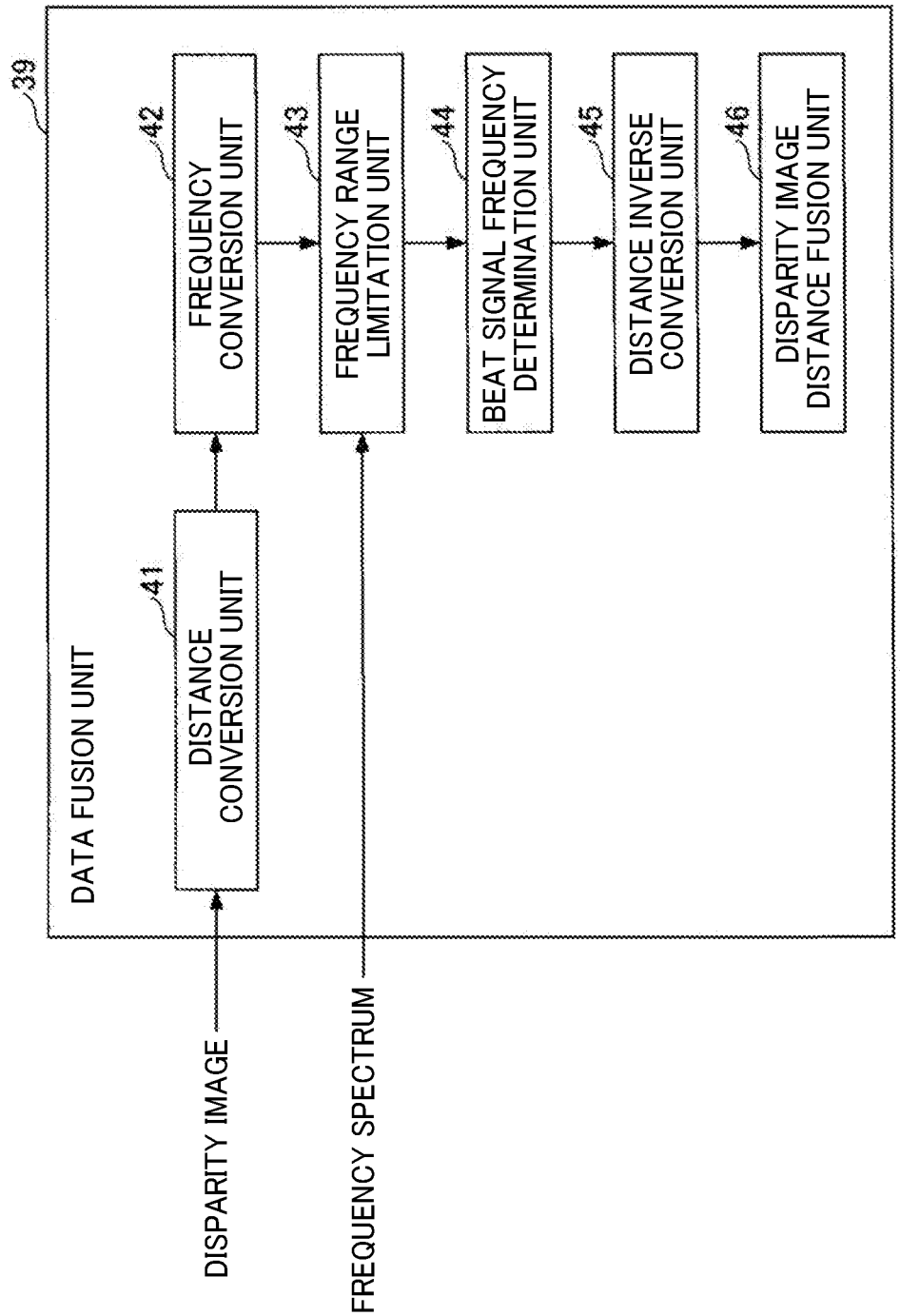
FIG. 13 is an example of a functional block diagram of a data fusion unit of a range finding system.

FIG. 13 is an example of a functional block diagram of the data fusion unit 39. The data fusion unit 39 includes, for example, a distance conversion unit 41, a frequency conversion unit 42, a frequency range limitation unit 43, a beat signal frequency determination unit 44, a distance inverse conversion unit 45, and a disparity image distance fusion unit 46. Each of the functions of the data fusion unit 39 may be implemented by the CPU by executing programs, or may be implemented by a hardware circuit, such as field programmable gate array (FPGA) and application specific integrated circuit (ASIC).

The distance conversion unit 41 converts the disparity of each pixel of the disparity image, output by the evaluation unit 38, into the distance "R" viewed from the radar ranging device 110.

The frequency conversion unit 42 converts the distance "R" into the frequency shift Δf, corresponding to a shift or deviation of the frequency of the transmission wave and the frequency of the reception wave, using the formula (4).

The frequency range limitation unit 43 limits a frequency range, used for detecting a peak having a power equal to or greater than a threshold value, near the frequency obtained by performing the conversion using the frequency conversion unit 42, for the frequency spectrum obtained by performing the Fourier transform to the beat signal.

The beat signal frequency determination unit 44 determines a local maximum value having a power equal to or greater than a threshold value from the frequency range limited by the frequency range limiting unit 43, in the frequency spectrum.

The distance inverse conversion unit 45 converts the frequency shift Δf, determined by the beat signal frequency determination unit 44, into the distance "R" using the formula (4), and then converts the distance "R" into the distance "L2" viewed from the stereo image generation device 120.

The disparity image distance fusion unit 46 fuses the distance "L1" determined for each pixel of the disparity image and the distance "L2" converted by the distance inverse conversion unit 45.

(Object Direction Detected by Millimeter Wave Radar)

Figure 14A:
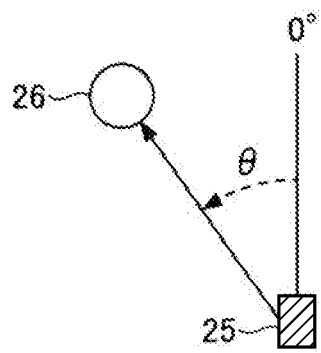
FIGS. 14A and 14B are an example of diagrams illustrating a direction of a target object.

Hereinafter, a description is given of a method of detecting a direction of a target object when the FCM method is applied with reference to FIG. 14. FIG. 14 illustrates a direction of the target object 26. FIG. 14A illustrates a top view of the millimeter wave transmission-reception device 25 and the target object 26. The FCM method estimates an arrival direction θ (also referred to as angle θ) of the reflection wave (reception wave) reflected in the horizontal plane. For example, if the traveling direction of the movable apparatus is set to 0°, θ is the angle (arrival direction) of the target object 26 in the horizontal direction.

Figure 14B:
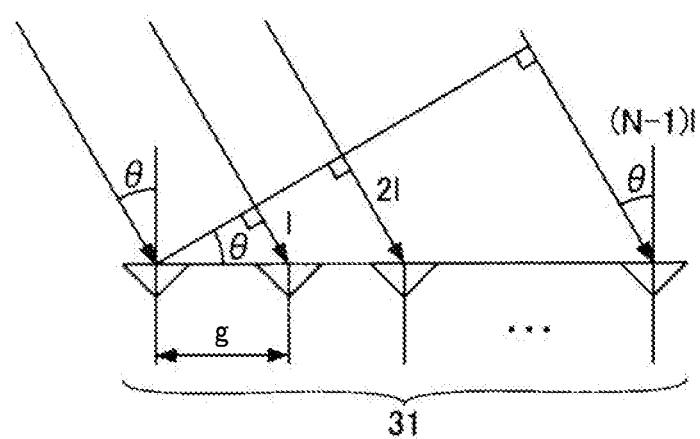

FIG. 14B illustrates a method of calculating the arrival direction θ of the reflection wave (reception wave) using a plurality of reception antennas 32. The arrival direction θ of the reception wave 28 can be detected using an array of antennas, such as the plurality of reception antennas 32. In an example case of FIG. 14B, the plurality of reception antennas 32 are arranged along a straight line with an interval "g," in which the number of the reception antennas 32 is referred to "N," in which "N" becomes 2, 3, 4, and so on. When the reception wave 28 comes from the arrival direction θ, the arrival propagation face becomes a flat plane when the distance between the target object 26 and the reception antenna 32 is sufficiently distant. The path difference "l" of the reflection waves received by the reception antennas 32 can be expressed as an integral multiple of "g sin θ." Since the path difference appears as a delay "r" of the reception wave 28, the arrival direction θ can be estimated when the delay amount of the reception wave 28 received by each of the reception antennas 32 is identified using a following formula (6).

$l = g \sin \theta$ $r = l/C = (g/C)\sin \theta$ $\theta = \arcsin(rC/g)$     (6)

(Calculation of Integer Disparity by Block Matching)

Figure 15:
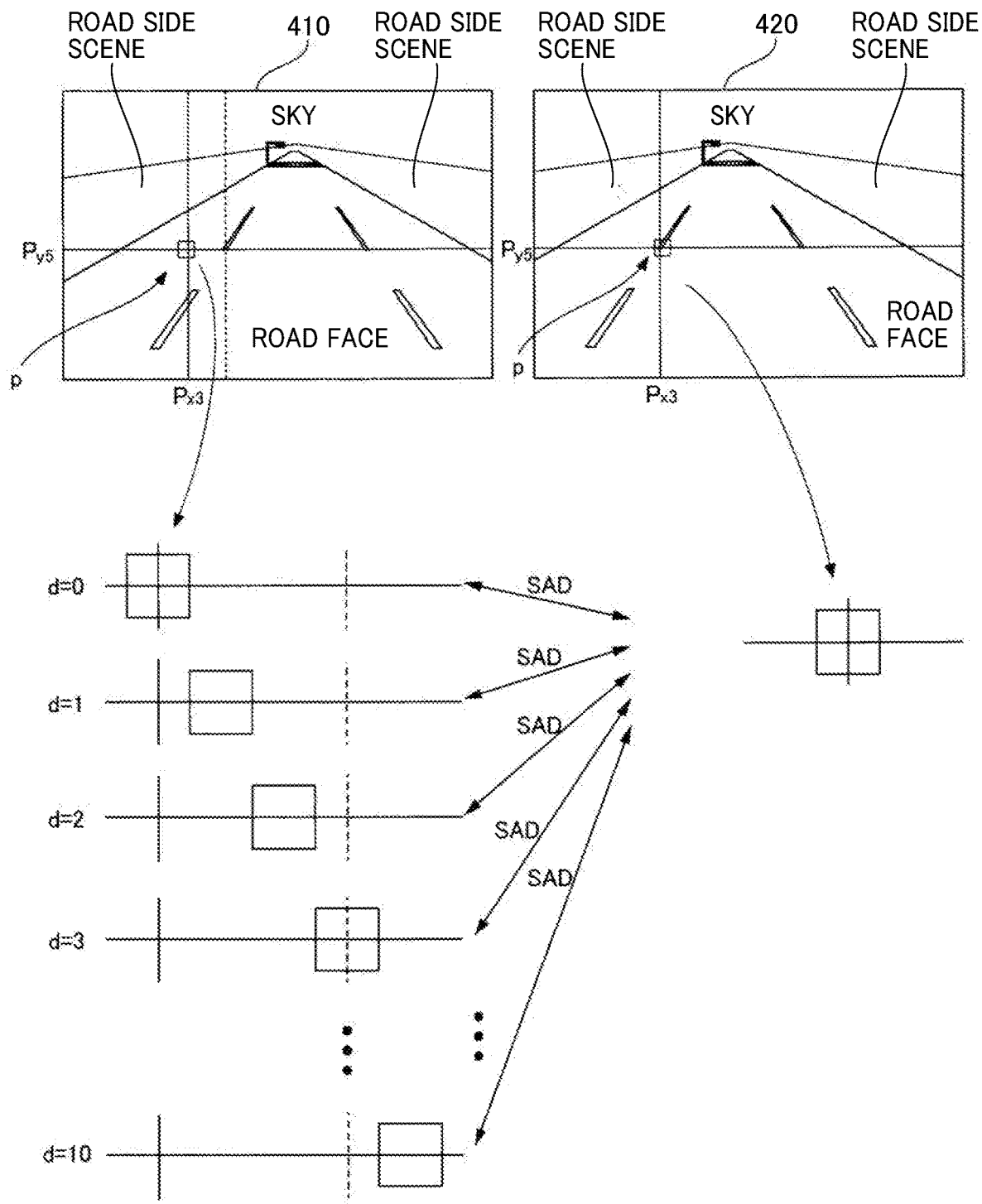
FIG. 15 illustrates an example of calculating a sum of absolute difference (SAD) as a cost of a concerned pixel p=(Px3, Py5) for a reference image captured by a right camera and a comparative image captured by a left camera.

Hereinafter, a description is given of a computation of the integer disparity "d" using the block matching with reference to FIG. 15. FIG. 15 illustrates an example case of calculating the sum of absolute difference (SAD) as a cost of a concerned pixel "p"=(Px3, Py5) for a reference image 420 captured by the right camera 11 and a comparative image 410 captured by the left camera 12. The SAD can be calculated using a below Math formula 1.

Since the reference image 420 and the comparative image 410 are respectively captured using the right camera 11 and the left camera 12 disposed at different positions (see FIGS. 7 and 8), the same position on the reference image 420 and the comparative image 410 (i.e., two captured image) such as the concerned pixel "p"=(Px3, Py5) does not indicate the same object, but the concerned pixel "p"=(Px3, Py5) on the reference image 420 and the comparative image 410 indicate positions that are slightly deviated in the left-to-right direction. Therefore, when a block size is set to one-by-one pixel and the SAD is computed, a difference between a luminance value of the concerned pixel "p"=(Px3, Py5) on the reference image 420 and a luminance value of the concerned pixel "p"=(Px3, Py5) on the comparative image 410 becomes a larger value.

In this case, the concerned pixel "p" on the comparative image 410 is shifted to the right by one pixel. That is, the SAD is calculated by setting the disparity "d"=1. Specifically, a difference between the luminance value of the concerned pixel "p"=(Px3+1, Py5) on the comparative image 410 and the luminance value of the concerned pixel "p"=(Px3, Py5) on the reference image 420 is calculated. In an example case of FIG. 15, the SAD becomes a larger value when the disparity "d"=1.

Similarly, in the same manner, the disparity values are changed, such as d=2, 3, . . . to calculate the SAD for each disparity value. In an example case of FIG. 15, when the disparity "d"=3, an object indicated by the concerned pixel "p"=(Px3, Py5) on the reference image 420, and an object indicated by the concerned pixel "p"=(Px3+3, Py5) on the comparative image 410 become the same. Therefore, the SAD value corresponding to the disparity "d"=3 becomes smaller than the SAD value corresponding to any disparity "d" other than the disparity "d"=3.

Figure 16A:
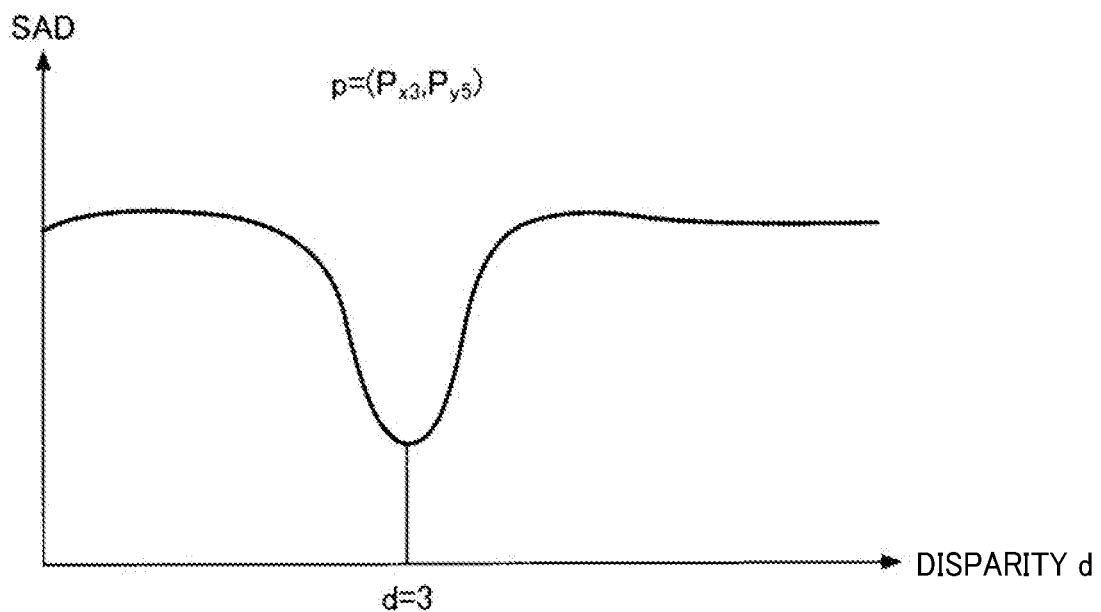
FIGS. 16A and 16B illustrate examples of SAD calculated as a cost of disparity of respective concerned pixels.

FIG. 16A illustrates an example of SAD calculated for one concerned pixel "p" along an axis of disparity (disparity axis). The SAD is calculated as an example of the stereo matching cost C(p,d). As to the one concerned pixel "p," because the SAD becomes the minimum value at d=3, the disparity "d" can be calculated as "3."

Figure 16B:
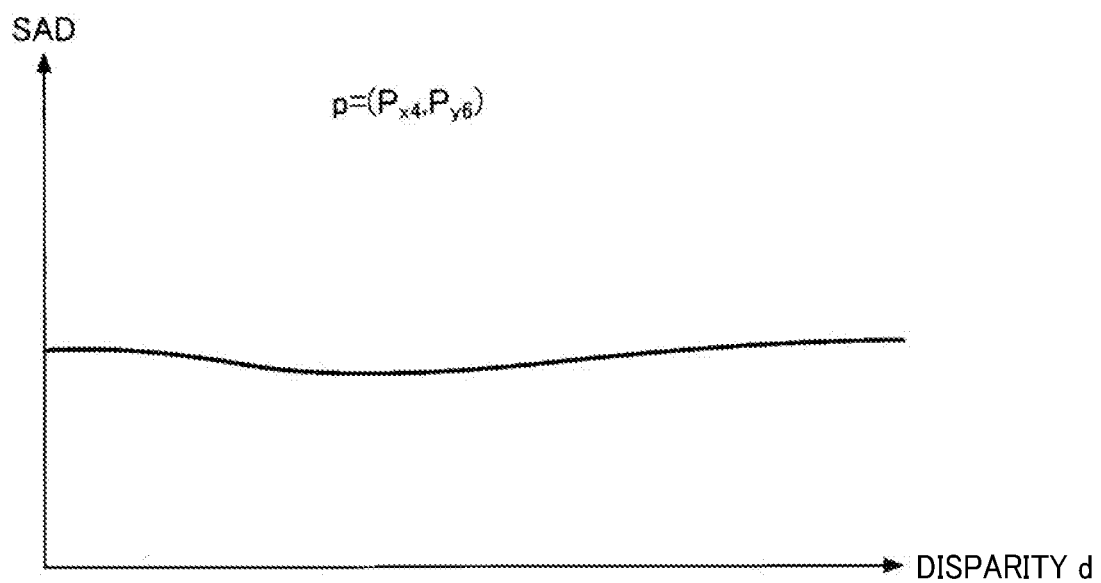

FIG. 16B illustrates an example of SAD calculated for another concerned pixel "p" along the axis of disparity (disparity axis). In an example case of FIG. 16B, since a change of SAD with respect to a change of the disparity "d" is small, the distance calculation unit 14 cannot extract the disparity. Thus, if the disparity of the concerned pixel cannot be determined by performing the block matching alone, the disparity of the concerned pixel can be effectively determined using the SGM propagation method.

When the SAD, such as the stereo matching cost C(p,d), is calculated for each disparity as illustrated in FIG. 16, it is preferable to obtain a decimal disparity. The decimal disparity can be obtained using known calculation methods, such as higher-order polynomial estimation (sixth order), a higher-order polynomial estimation (fourth order), or a parabolic fitting. In the following description, an integer disparity "d" is used for the simplicity of description.

$$SAD = \sum_y \sum_x |A(x, y) - B(x, y)| \qquad \text{(Math formula 1)}$$

As indicated in Math formula 1, the SAD is a computing operation in which the absolute value of the difference of luminance values is calculated, and then the sum of the difference is set as a correlation value. The more similar the pixel blocks, the smaller the correlation value.

Further, as to the block matching, in addition to the SAD, computing operations such as, sum of squared difference (SSD), normalized cross correlation (NCC), and zero means normalized cross correlation (ZNCC) can be adopted.

$$SSD = \sum_y \sum_x (A(x, y) - B(x, y))^2 \qquad \text{(Math formula 2)}$$

The SSD is a computing operation in which the second power of the difference of luminance values is calculated, and then the sum of the difference is set as a correlation value. The more similar the pixel blocks, the smaller the correlation value.

$$NCC = \frac{\sum_y \sum_x A(x, y)B(x, y)}{\sqrt{\sum_y \sum_x A(u, v)^2 \sum_y \sum_x B(x, y)^2}} \qquad \text{(Math formula 3)}$$

The NCC is a computing operation in which the inner product of luminance values is calculated as numerator. The more similar the luminance values, the greater the inner product. As to the NCC, the denominator is a numerical value that normalizes the value of the numerator. The more similar the pixel blocks, the greater the denominator value. The NCC takes a maximum value of "1" and a minimum value of "0." The NCC is also known as normalized cross-correlation.

$$ZNCC = \frac{\sum_y \sum_x (A(x, y) - \overline{A})(B(x, y) - \overline{B})}{\sqrt{\sum_y \sum_x (A(x, y) - \overline{A})^2 \sum_y \sum_x (B(x, y) - \overline{B})^2}} \qquad \text{(Math formula 4)}$$

-continued $$\overline{A} = \frac{1}{MN} \sum_y \sum_x A(x, y),$$

$$\overline{B} = \frac{1}{MN} \sum_y \sum_x B(x, y)$$

The ZNCC is a normalized cross-correlation after subtracting the average value. From a view point of frequency, the ZNCC is equivalent to removing the direct current component, and the ZNCC is effective for comparing images having different brightness.

Alternatively, zero means sum of absolute difference (ZSAD) or zero means sum of squared difference (ZSSD) can be adopted. The ZSAD is the SAD after subtracting the average value, and the ZSSD is the SSD after subtracting the average value.

(Propagation by Propagation Unit)

The propagation unit 40 calculates a propagation cost Lr(p,d) based on the stereo matching cost C(p,d) obtained for each pixel using a following formula (7).

$$L_r(p,d) = C(p,d) + \min(L_r(p-r,d), L_r(p-r,d-1) + P_1, L_r(p-r,d+1) + P_1, \min L_r(p-r,i) + P_2) \qquad (7)$$

The above formula (7) is a general formula used for calculating the propagation cost Lr using the SGM. Further, in the above formula (7), P1 and P2 are fixed parameters.

Figure 17:
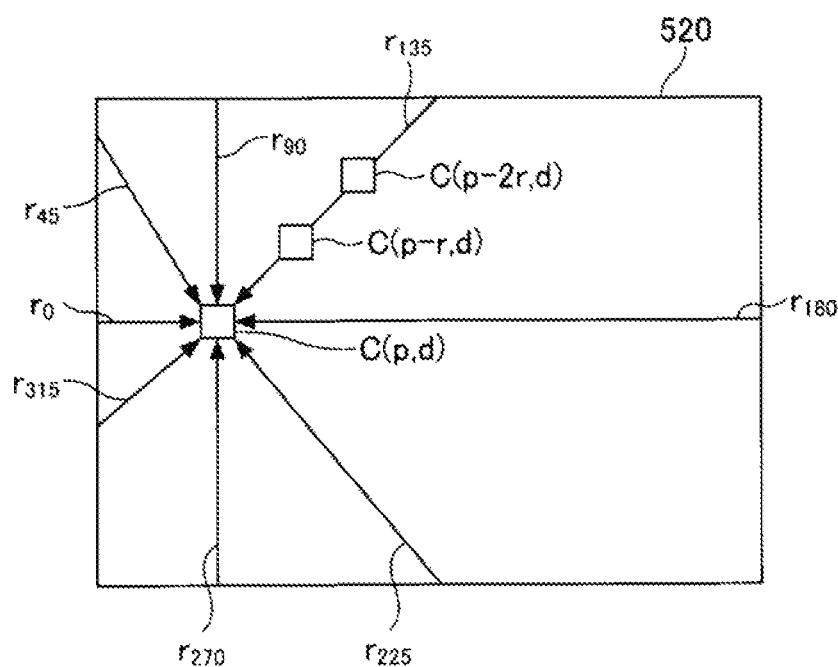
FIG. 17 illustrates an example of "r" direction used for calculating a propagation cost Lr(p,d)

By using the formula (7), the propagation unit 40 adds the minimum value of the propagation cost Lr in each pixel region along the "r" direction (see FIG. 17) to the stereo matching cost C(p,d) of image data to obtain the propagation cost Lr(p,d). FIG. 17 is an example diagram illustrating the "r" direction used for calculating the propagation cost Lr(p, d).

As illustrated in FIG. 17, the propagation unit 40 calculates a first propagation cost Lr (e.g., Lr135(p−2r,d)) at a pixel region at the farthest end of in the "r" direction (e.g., r135 direction) in the image data. Then, the propagation unit 40 calculates the first propagation cost Lr (e.g., Lr135(p−r, d)) along the "r" direction (e.g., r135 direction). In the first embodiment, the propagation unit 40 repeats the above described calculation to calculate the propagation cost Lr (e.g., Lr 135(p,d)), and further performs the above described calculation for a multiple directions (e.g., eight directions in FIG. 17) to obtain the propagation costs of Lr0(p,d) to Lr315(p,d).

Then, the propagation unit 40 calculates the synthesis cost S(p,d) based on the propagation costs Lr0(p,d) to Lr315(p,d) obtained for the eight directions using a following formula (8). The number of directions is not limited to eight directions, but can be any directions, such as two directions, four directions, and so forth.

$$S(p, d) = \sum_r L_r(p, d) \qquad (8)$$

(Limiting of Frequency Range of Beat Signal)

Figure 18A:
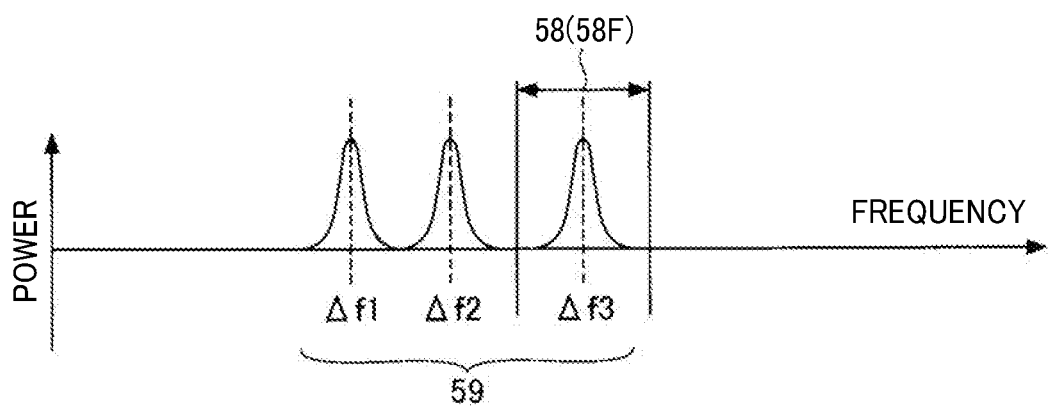
FIGS. 18A and 18B illustrate examples of frequency spectrum obtained by performing the Fourier transform to a beat signal.
Figure 18B:
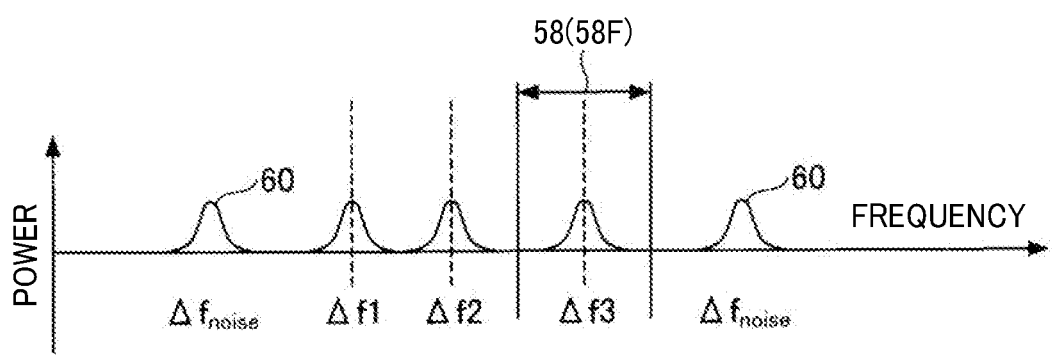

Hereinafter, a description is given of a method of limiting a frequency range of beat signal with reference to FIGS. 18 and 19. FIGS. 18A and 18B illustrate examples of frequency spectrum obtained by performing the Fourier transform to a beat signal. FIG. 18A illustrates one example state of the reflection wave not having a noise, and FIG. 18B illustrates another example state of the reflection wave having noises.

FIG. 19 is an example of a flowchart illustrating a procedure in which the data fusion unit 39 fuses the distance "L1" obtained from the disparity image and the distance "R" detected by performing the FCM method.

Figure 20:
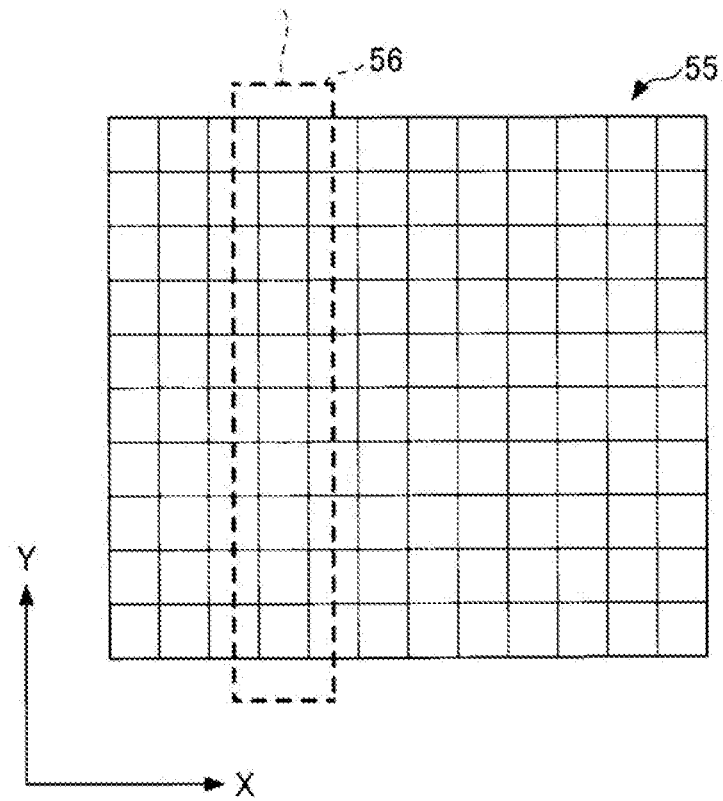
FIG. 20 illustrates an example of relationship of image data and an arrival direction of reflection wave of a millimeter wave radar.

(Step S1) The distance conversion unit 41 converts the disparity of each pixel of the disparity image into the distance "L1." The distance conversion unit 41 converts the disparity of each pixel corresponding to the direction where the target object 26 is detected (see FIG. 20). Further, the distance conversion unit 41 can convert the disparity of all of pixels of image data of one image into the distance "L1." The disparity "d" and the distance "L1" have a relationship represented by a following formula (9). In a case of a pinhole camera, the distance "L1" can be calculated using the formula (9).

$$L1=(B \times F/p)/d \quad (9)$$

In the formula (9), "B" represents the baseline length, "F" represents the focal length, "p" represents the pixel pitch, and "d" represents the disparity.

The distance "L1" is expressed in the XYZ space when viewed from the stereo image generation device 12 while the distance "R" is expressed by the $R\theta\varphi$ polar coordinate system when viewed from the radar ranging device 110. Therefore, the distance "R" obtained by the radar ranging device 110 and the distance "L1" obtained by the stereo image generation device 120 have a relationship of "L=R cos θ." Therefore, the distance "L1" calculated using the formula (9) can be converted into the distance "R" represented by the $R\theta\varphi$ polar coordinate system using a following formula (10).

$$R=L/\cos\theta \quad (10)$$

(Step S2) Then, the frequency conversion unit 42 converts the distance "R" calculated using the formula (10) into a frequency shift Δf Specifically, the frequency conversion unit 42 converts the distance "R" into the frequency shift Δf using the formula (4).

$$\Delta f=(2F/CT) \times (L/\cos\theta)=2FBf/(CTpd \cos\theta) \quad (11)$$

(Step S3) Then, the frequency range limitation unit 43 limits a frequency range of beat signal to a frequency near the frequency shift Δf converted from the distance "R." For example, a parameter α used for determining the frequency range is set, in which "Δf±α" is set to limit of the frequency range used for detecting the peak of the frequency spectrum. The parameter α is a design value that is determined appropriately. The parameter α can be a fixed value or a variable value. In a case of the fixed value, an average of a half width of the frequency shift Δf can be used. In a case of the variable value, for example, about a half of the average of some peak values appearing in the frequency spectrum can be used.

In an example case of FIG. 18A, the limited frequency range of "Δf±α" is indicated by an arrow 58 (58F). Therefore, even if a peak 60 caused by a noise appears in the frequency spectrum as illustrated in FIG. 18B, the probability of detecting the noise erroneously as a peak of the beat signal related to the reflection wave coming from the target object 26 can be reduced, in particular prevented.

(Step S4) Then, the beat signal frequency determination unit 44 determines a local maximum value having a power equal to or greater than a threshold value within the frequency range limited by the frequency range limitation unit 43. The frequency corresponding to the local maximum value becomes the frequency shift Δf. The threshold value is set with a given power value that can be used for estimating a presence of the beat signal caused by the target object 26 existing in a space.

(Step S5) Then, the distance inverse conversion unit 45 converts the frequency shift Δf, determined by the beat signal frequency determination unit 44, into the distance "R" using the formula (4), and then converts the distance "R" into the distance "L2" viewed from the stereo image generation device 120 using the formula (10).

(Step S6) Then, the disparity image distance fusion unit 46 integrates or fuses the distance "L1" of each pixel of the disparity image and the distance "L2" converted by the distance inverse conversion unit 45. Hereinafter, the processing of integration or fusion is described.

FIG. 20 illustrates an example of a relationship of image data 55 (e.g., reference image) and an arrival direction θ of the reflection wave (reception wave) of the millimeter wave radar. In this description, it is assumed that the millimeter wave radar can specify or identify the direction of the target object 26 in the horizontal direction alone. If a position of the target object 26 can be also determined in the elevation direction, the pixel range of image data is further limited to perform the fusion.

Since the relationship of the arrival direction θ of the reflection wave (reception wave) and the X coordinate of pixel is fixed, the relationship of the arrival direction θ and the X coordinate of pixel is set based on the calibration that was performed at the time of shipment from the factories. For example, if the resolution of the arrival direction θ is five degrees (5 degrees) and a scan range of the millimeter wave radar of the millimeter wave transmission-reception device 25 is 40 degrees to each of the right and left sides, the image data 55 is divided into 16 equal segments along the horizontal direction based on a calculation of "80/5=16." In FIG. 20, a range 56 corresponding to the arrival direction θ of the reflection wave (reception wave) is indicated by a dotted line.

Therefore, if the arrival direction θ of the reflection wave (reception wave) is determined, the pixel column in the horizontal direction is determined. In an example case of FIG. 20, the pixel column is one column, but the pixel column can be a plurality of pixel columns. The disparity image distance fusion unit 46 fuses the distance "L1" and the distance "L2" for all of the pixels included in the range 56. However, if the number of pixel columns is large, the disparity image distance fusion unit 46 can be configured to perform the fusing only for some pixel columns existing in the center of the plurality of pixel columns. Further, the disparity image distance fusion unit 46 can be configured to perform the fusing only in a region where the target object 26 is known to exist based on the object recognition performed by using the reference image.

The fusion of the distance "L1" and the distance "L2" can be performed using, for example, the following methods (i), (ii), or (iii).

(i) The distance "L1" obtained by performing the block matching is compulsory replaced with the distance "L2" obtained by performing the FCM method.

(ii) As to the distance "L2" obtained by using the millimeter wave radar and the distance "L1" obtained by performing the block matching, any one of the distance "L2" and the distance "L1" having a higher reliability is used.

(iii) Weight is set for the distance "L1" and the distance "L2" in accordance with the distance value.

The method (i) is effective when the reliability of distance "L2" is always higher than the reliability of distance "L1."

The method (ii) can select an optimal distance based on the distance to the target object 26. For example, if the threshold value is set to 40 [m] and the distance "L2" obtained by using the millimeter wave radar is equal to or smaller than 40 [m], the distance "L1" is prioritized, and when the distance "L2" is greater than 40 [m], the distance "L1" is replaced with the distance "L2."

The method (iii) can utilize both of the distance "L1" and the distance "L2" for the distance image depending on the reliability of the distance "L1" and the distance "L2." For example, "p+q=1" and "q=L2/150" can be set, in which 150 is an example of a maximum value of the far distance position or location that can be measured (detected) by using the millimeter wave radar. The greater the distance "L2," the greater the "q." If the distance to be obtained by performing the fusion is "pL1+qL2" when the distance "L2" is smaller, the weighting of the distance "L1" obtained by the stereo matching can be increased, and when the distance "L2" is greater, the weighting of the distance "L2" obtained by using the millimeter wave radar can be increased.

As to the above described first embodiment, the range finding system 100 can fuse the range finding value obtained by using the millimeter wave radar and the range finding value obtained by performing the block matching on the reference image and the comparative image before converting the range finding value obtained by performing the block matching into the distance image. Therefore, the distance image having a smaller dispersion for the range finding value and a higher spatial resolution can be obtained even if the target object exists at the far distance position. Further, since the frequency range set in the frequency spectrum, obtained by performing the Fourier transform to the beat signal, is limited using the range finding value obtained by performing the block matching, the probability of detecting erroneously the noise as a peak related to the target object 26 can be reduced, thereby the number of the target objects and the distance to each target object can be detected with an improved precision.

Second Embodiment

In a second embodiment, a description is given of a range finding system 100 that generates a distance image by fusing the stereo matching cost generated by the evaluation unit 38 and the frequency spectrum generated by the radar ranging device 110.

Figure 21:
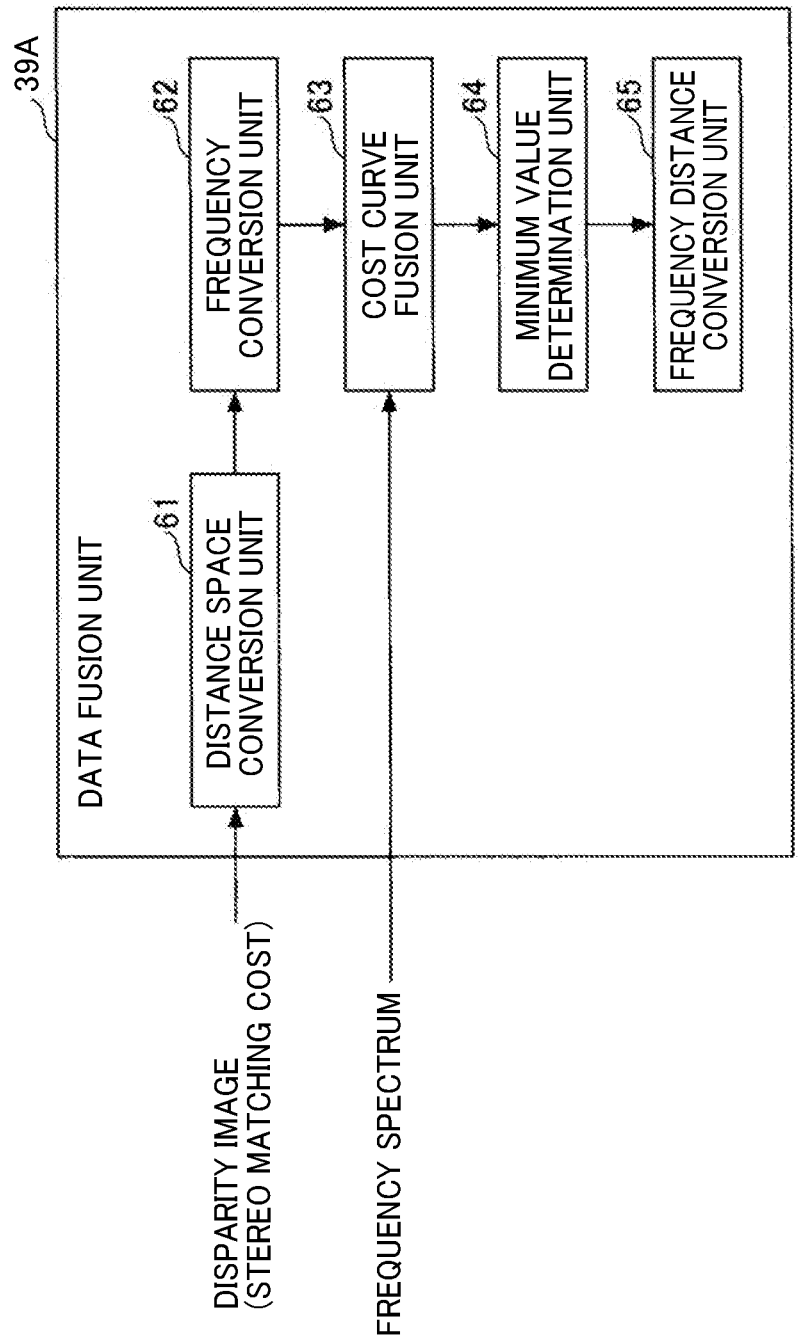
FIG. 21 is an example of a functional block diagram of a data fusion unit according to a second embodiment.

FIG. 21 is an example of a functional block diagram of a data fusion unit 39A of the second embodiment. The data fusion unit 39A includes, for example, a distance space conversion unit 61, a frequency conversion unit 62, a cost curve fusion unit 63, a minimum value determination unit 64, and a frequency distance conversion unit 65. Each of the functions of the data fusion unit 39A may be implemented by the CPU by executing programs, or may be implemented by a hardware circuit, such as field programmable gate array (FPGA) and application specific integrated circuit (ASIC).

The distance space conversion unit 61 acquires a disparity image from the evaluation unit 38, in which the stereo matching cost of disparity space is set for each pixel of the disparity image. That is, the stereo matching cost of each one of the disparities and the disparity having the minimum value of the stereo matching cost are retained. The distance space conversion unit 61 applies the above formulas (9) and (10) to the disparity space for each pixel to convert the disparity space into a dice space of the radar ranging device 110. Since the distance becomes longer at the far distance position, the interpolation may be performed as needed.

The frequency conversion unit 62 converts the stereo matching cost of distance space into the stereo matching cost of frequency space by applying the above formula (4). That is, the horizontal axis of the stereo matching cost profile is adjusted to the frequency, which is the physical quantity set as the horizontal axis of the frequency spectrum profile.

The cost curve fusion unit 63 fuses the stereo matching cost of frequency space and the frequency spectrum of beat signal to generate a fusion cost curve.

The minimum value determination unit 64 determines a frequency having the minimum value in the fusion cost curve of frequency space.

The frequency distance conversion unit 65 converts the determined frequency into the distance "R" using the above formula (4), and further converts the distance "R" into the distance "L2" viewed from the stereo image generation device 120 using the above formula (10). Then, the distance "L2" is set for each pixel to generate a distance image.

(Fusion of Distance using Cost Curve)

Hereinafter, a description is given of fusing of the stereo matching cost and the frequency spectrum with reference to FIGS. 22 to 24. FIG. 22 is an example flowchart illustrating a procedure in which the data fusion unit 39A fuses the stereo matching cost of the disparity image and the frequency spectrum. The sequential processing of FIG. 22 is performed for each pixel corresponding to the arrival direction $\theta$ of the reflection wave (reception wave).

(Step S11) At first, the distance space conversion unit 61 converts the stereo matching cost of disparity space of each pixel, generated by the evaluation unit 38, into a cost curve of distance space. This conversion is described with reference to FIG. 23.

Figure 23A:
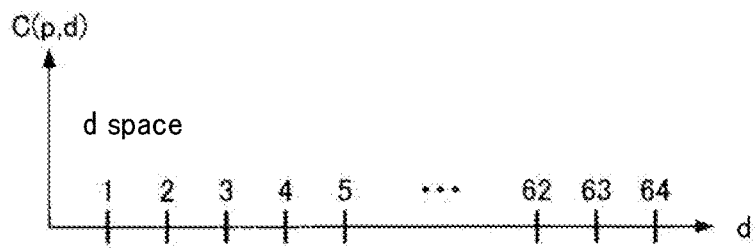
FIGS. 23A, 23B and 23C illustrate a scheme of converting stereo matching cost of a disparity space into stereo matching cost of a distance space.

FIG. 23 illustrates a scheme of converting the stereo matching cost of the disparity space into the stereo matching cost of the distance space. The distance in the distance space is the distance "L1" viewed from the stereo image generation device 120. FIG. 23A illustrates the stereo matching cost C(p,d) in the disparity space by setting the shift amount (i.e., disparity) obtained by performing the block matching (or SGM propagation method) as the horizontal axis. In an example case of FIG. 23A, a search range is set to 64 pixels. In FIG. 23A, "p" represents a pixel of interest (or concerned pixel "p") and "d" represents the shift amount (i.e., search-used disparity) of the reference image and the comparative image.

Figure 23B:
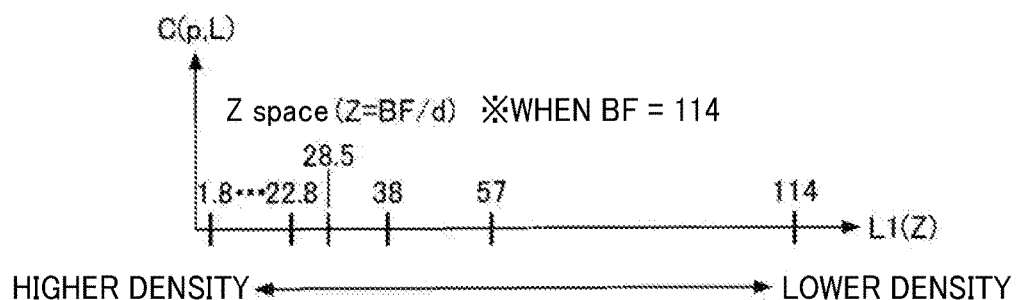

FIG. 23B illustrates the stereo matching cost C(p,L) in the distance space. The method of converting the disparity "d" (FIG. 23A) into the distance "L1" is above described in step S1 of FIG. 19. As illustrated in FIG. 23B, in the distance space, a lower density and a higher density occur in the distance "L1" where the stereo matching cost C(p,L) is obtained. This is because the denominator of formula (9) used for calculating the distance "L1" includes the disparity "d," in which the distance "L1" is inversely proportional to the disparity "d" so that the distance "L1" changes greatly when the disparity "d" is closer to "zero (0)".

Therefore, conventional block matching may be synonymous with coarse or rough cost propagation at the far distance position, causing difficulty to obtain higher precision at the far distance position.

Figure 23C:
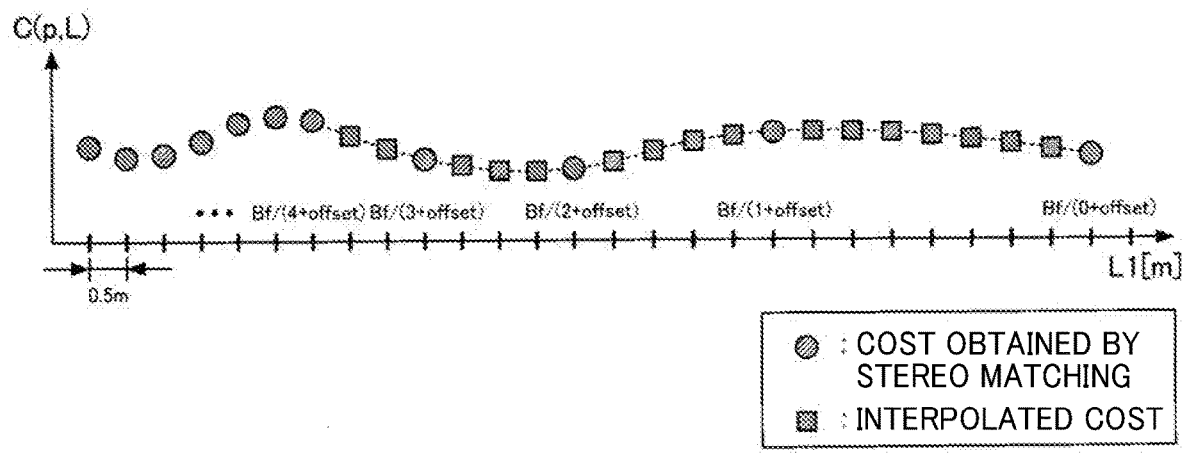

Therefore, as illustrated in FIG. 23C, the stereo matching cost of distance space is interpolated to implement an effective countermeasure. The distance space conversion unit 61 interpolates the stereo matching cost of distance space. In an example case of FIG. 23C, each circle represents the cost obtained by the stereo matching, and each square represents the cost obtained by the interpolation. The interpolation can be performed using any known methods suitable for the curve approximation, such as parabolic fitting interpolation, higher-order polynomial interpolation, spline curve interpolation, or the like. In an example case of FIG. 23C, the stereo matching cost C(p,L) is calculated every 0.5 meters by performing the interpolation. In an example case of FIG. 23C, an offset is a fraction for obtaining the distance "R" every 0.5 meters.

Returning to FIG. 22, the sequence is further described.

(Step S12) Then, the frequency conversion unit 62 converts the stereo matching cost of distance space into the stereo matching cost (cost curve) of frequency space. The frequency conversion unit 62 converts the distance "L1" into the distance "R" represented by the Rθφ polar coordinate system using the formula (10), in which 0 represents the arrival direction of the reflection wave. Then, the frequency conversion unit 62 converts the distance "R" into the frequency space using the formula (4).

(Step S13) Then, the cost curve fusion unit 63 fuses the stereo matching cost of frequency space and the frequency spectrum of beat signal to generate a fusion cost curve.

FIG. 24 is an example of a diagram illustrating a process of generating the fusion cost curve. FIG. 24A illustrates the stereo matching cost of frequency space. FIG. 24B illustrates the frequency spectrum of beat signal. In an example case of FIG. 24B, one peak is identified at a frequency Δf1. If the stereo matching cost becomes the minimum value (or local minimum value) at the frequency M1, it can be assumed that the distance to the target object 26 is detected in the disparity image with higher precision.

However, if the frequency spectrum and the stereo matching cost of frequency space are simply added, the local maximum value may occur at the frequency Δf1, causing difficulty to determine the frequency Δf1. Therefore, the cost curve fusion unit 63 inverts the frequency spectrum using a value of "zero (0)" as a reference value, and adds the inverted frequency spectrum to the stereo matching cost.

Figure 24A:
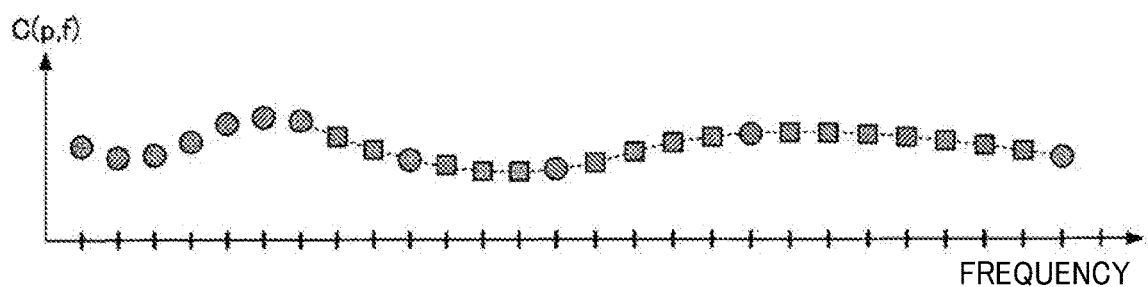
FIGS. 24A, 24B, 24C and 24D illustrate a process of generating a fusion cost curve.
Figure 24B:
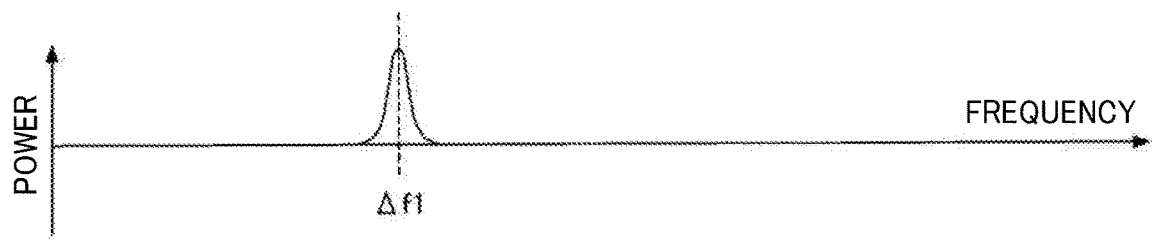
Figure 24C:
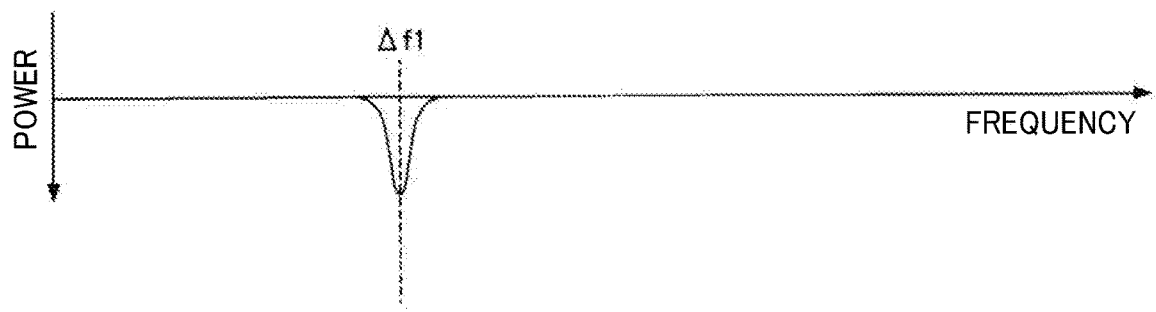
Figure 24D:
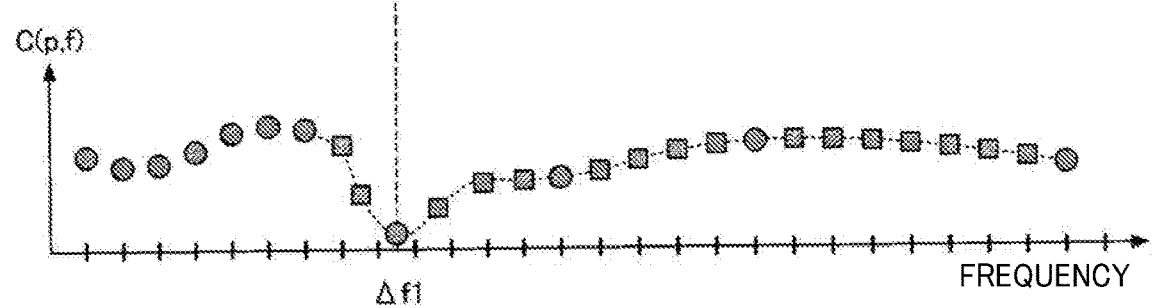

FIG. 24C illustrates a frequency spectrum inverted from the frequency spectrum of FIG. 24B using "zero (0)" as the reference value. When the frequency spectrum of FIG. 24C is added to the stereo matching cost of frequency space of FIG. 24A, a fusion cost curve having the minimum value (or local minimum value) at the frequency M1 can be obtained easily. FIG. 24D schematically illustrates the obtained fusion cost curve.

Returning to FIG. 22, the sequence is further described.

(Step S14) Then, the minimum value determination unit 64 determines a frequency having the minimum value in the fusion cost curve of frequency space. Specifically, the minimum value determination unit 64 determines the frequency shift Δf1 as illustrated in FIG. 24D.

(Step S15) Then, the frequency distance conversion unit 65 converts the frequency shift Δf1, determined in step S14, into the distance "R" using the formula (4). Since the distance "R" is represented by the Rθφ polar coordinate system, the distance "R" is converted into the distance "L2" of the distance space of the stereo image generation device 120 using the formula (10). The data fusion unit 39A performs the sequential processing of FIG. 22 for all of pixels corresponding to the arrival direction θ of the reflection wave (reception wave). Then, the distance "L2" of each pixel is set to the image data to generate a distance image.

As to the above described second embodiment, the range finding system 100 can fuse the range finding value obtained by using the millimeter wave radar and the range finding value obtained by performing the block matching before converting the range finding value determined by the block matching into the distance image. Therefore, the distance image having a smaller dispersion for the range finding value and a higher spatial resolution can be obtained even if the target object exists at the far distance position. Further, since the minimum value is determined by fusing the stereo matching cost and the frequency spectrum of beat signal, the minimum value can be easily determined even if the stereo matching cost becomes substantially constant value (i.e., a value profile becomes substantially flat).

Third Embodiment

In a third embodiment, a description is given of the range finding system 100 that generates a distance image by fusing the stereo matching cost generated by the evaluation unit 38 and the frequency spectrum generated by the radar ranging device 110. In the third embodiment, the time axis or space is used, which is not used in the second embodiment.

Figure 25:
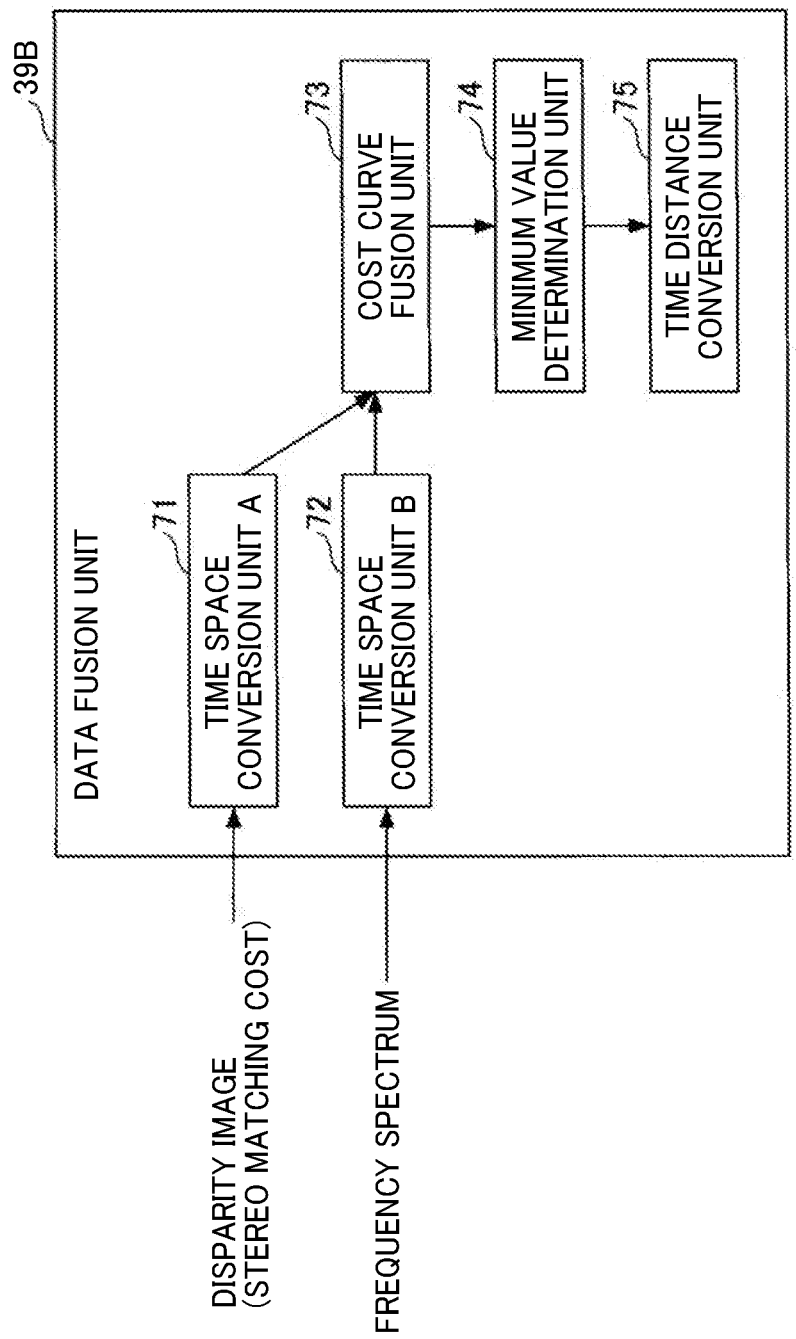
FIG. 25 is an example of a functional block diagram of a data fusion unit according to a third embodiment.

FIG. 25 is an example of a functional block diagram of a data fusion unit 39B of the third embodiment. The data fusion unit 39B includes, for example, a time space conversion unit A 71, a time space conversion unit B 72, a cost curve fusion unit 73, a minimum value determination unit 74, and a time distance conversion unit 75. Each of the functions of the data fusion unit 39B may be implemented by the CPU by executing programs, or may be implemented by a hardware circuit, such as field programmable gate array (FPGA) and application specific integrated circuit (ASIC).

The time space conversion unit A 71 acquires a disparity image from the evaluation unit 38, in which the stereo matching cost of disparity space is set for each pixel of the disparity image. That is, the stereo matching cost of each one of the disparities and the disparity having the minimum value of the stereo matching cost are retained. The time space conversion unit A 71 converts the disparity space into the stereo matching cost of time space for each pixel. The time space conversion unit B 72 converts the frequency of frequency spectrum into the spectrum of time space. That is, the time space conversion unit B 72 converts the frequency of frequency spectrum into the spectrum of time component. The time and frequency have a relationship indicated by a following formula (12).

$$t = 1/f \qquad (12)$$

The cost curve fusion unit 73 fuses the stereo matching cost of time space and the spectrum of beat signal in the time space to generate a fusion cost curve.

The minimum value determination unit 74 determines a frequency having the minimum value in the fusion cost curve of the time space.

The time distance conversion unit 75 converts the determined time into the distance "R," and then converts the distance "R" into the distance "L2" viewed from the stereo image generation device 120. Then, the distance L2" is set for each pixel to generate a distance image.

(Fusion of Distance using Cost Curve)

Hereinafter, a description is given of the fusing of the stereo matching cost and the frequency spectrum with reference to FIGS. 26 and 27. FIG. 26 is an example flowchart illustrating a procedure in which the data fusion unit 39B fuses the stereo matching cost of the disparity image and the spectrum of beat signal in the time space. The sequential processing of FIG. 26 is performed for each pixel corresponding to the arrival direction θ of the reflection wave (reception wave).

(Step S21) At first, the time space conversion unit A 71 converts the stereo matching cost of disparity space of each pixel, generated by the evaluation unit 38, into a cost curve of the time space. Specifically, the time space conversion unit A 71 converts the disparity "d" into the distance "L1" using the formula (9), and then converts the distance "L1" into the distance "R" using the formula (10). Then, the time space conversion unit A 71 converts the distance "R" into the time "t" using the formula (1).

Figure 27A:
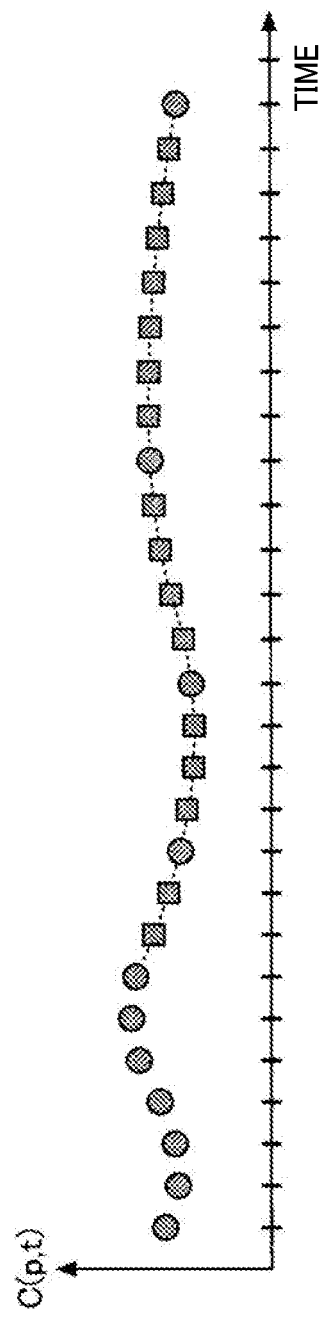
FIGS. 27A and 27B illustrate an example of stereo matching cost and a fusion cost curve in a time space according to the third embodiment.

In the third embodiment, since the lower density and higher density occur to the stereo matching cost with respect to the time "t," as above described with reference to FIG. 23C, the interpolation is performed as needed. FIG. 27A illustrates an example of the stereo matching cost of time space. Compared to the stereo matching cost of FIG. 23C, the horizontal axis represents the time axis in FIG. 27A.

Returning to FIG. 26, the sequence is further described.

(Step S22) Then, the time space conversion unit B 72 converts the frequency spectrum of beat signal into the spectrum of time space using the formula (12).

Figure 27B:
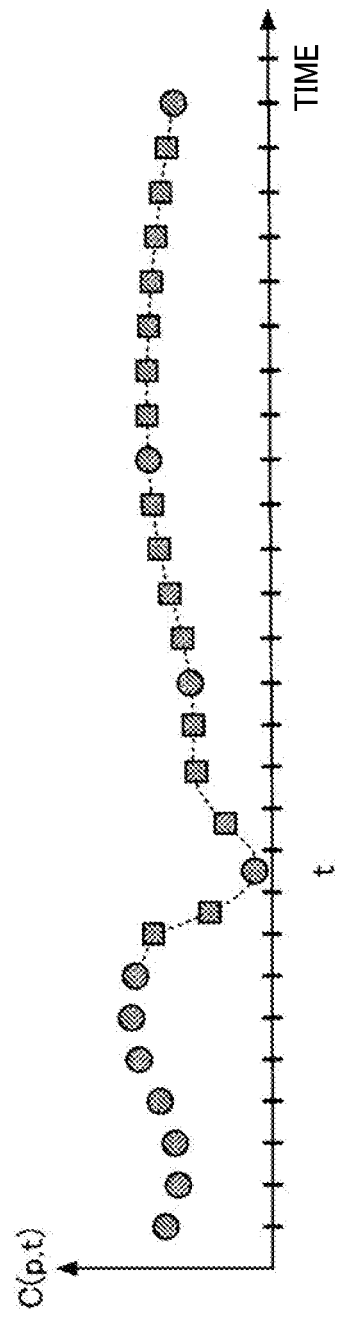

(Step S23) Then, the cost curve fusion unit 73 fuses the stereo matching cost of time space and the spectrum of beat signal in the time space to generate a fusion cost curve. As above described with reference to FIG. 24, the spectrum of beat signal in the time space is inverted using "zero (0)" as the reference value. FIG. 27B schematically illustrates an example of the fusion cost curve.

Returning to FIG. 26, the sequence is further described.

(Step S24) Then, the minimum value determination unit 74 determines a time "t" where a value becomes the minimum value in the fusion cost curve of the time space.

(Step S25) Then, the time distance conversion unit 75 converts the time "t" determined in step S24 into the distance "R" using the formula (1), and then converts the distance "R" into the distance "L2" viewed from the stereo image generation device 120 using the formula (10). The data fusion unit 39B performs the sequential processing of FIG. 26 for each pixel corresponding to the arrival direction θ of the reflection wave (reception wave). Then, the distance "L2" of each pixel is set to the image data to generate a distance image.

As to the above described third embodiment, the range finding system 100 can fuse the range finding value obtained by using the millimeter wave radar and the range finding value obtained by performing the block matching before converting the range finding value obtained by performing the block matching into the distance image. Therefore, the distance image having a smaller dispersion for the range finding value and a higher spatial resolution can be obtained even if the target object exists at the far distance position. Further, since the minimum value is determined by fusing the stereo matching cost and the frequency spectrum of beat signal, the minimum value can be easily determined even if the stereo matching cost become substantially constant value (i.e., a value profile becomes substantially flat).

Fourth Embodiment

In a fourth embodiment, a description is given of the range finding system 100 that performs the processing of the first embodiment in the same manner using a time axis.

Figure 28:
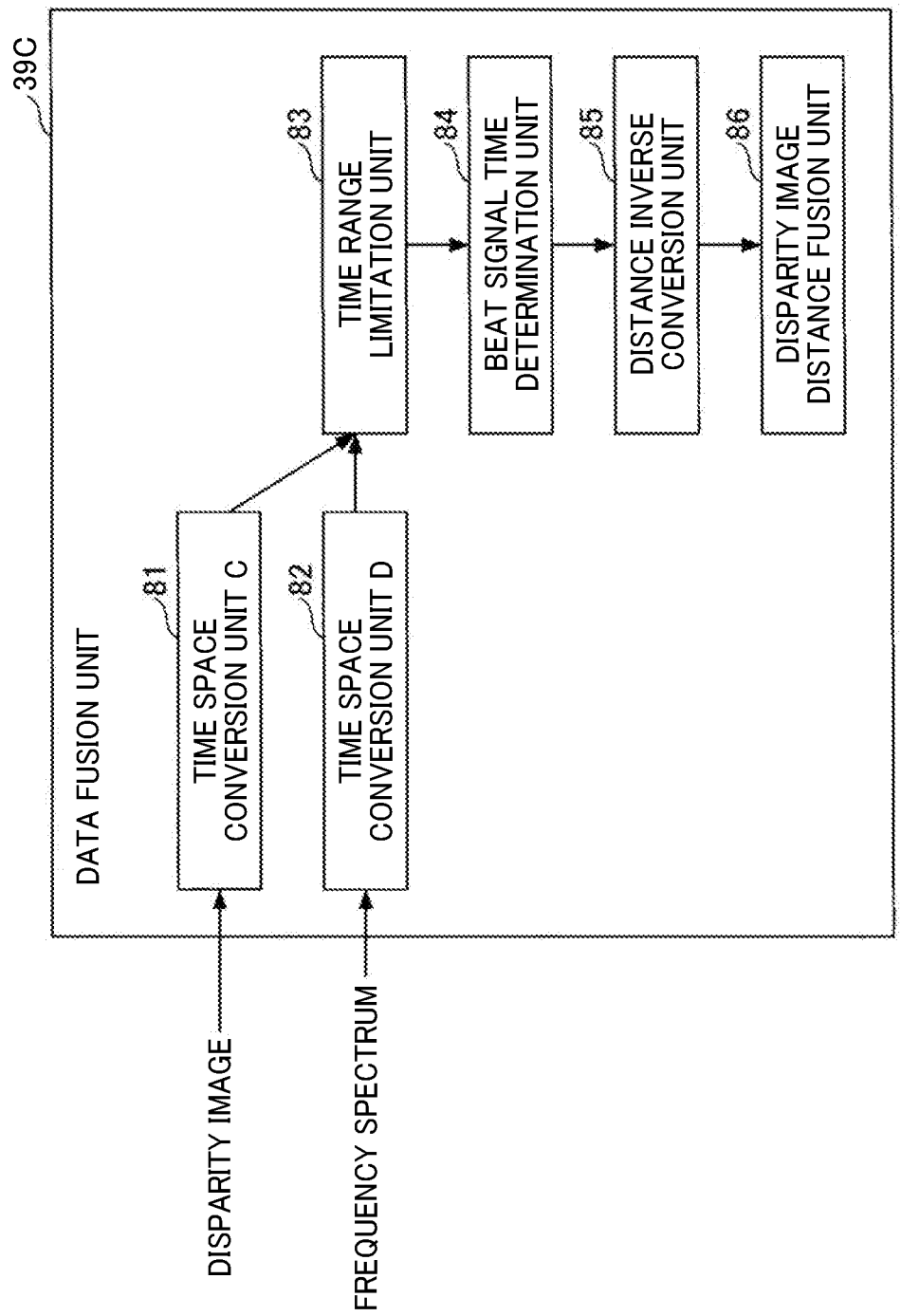
FIG. 28 illustrates an example of a functional block diagram of a data fusion unit according to a fourth embodiment.

FIG. 28 is an example of a functional block diagram of a data fusion unit 39C of the fourth embodiment. The data fusion unit 39C includes, for example, a time space conversion unit C 81, a time space conversion unit D 82, a time range limitation unit 83, a beat signal time determination unit 84, a distance inverse conversion unit 85, and a disparity image distance fusion unit 86. Each of the functions of the data fusion unit 39C may be implemented by the CPU by executing programs, or may be implemented by a hardware circuit, such as field programmable gate array (FPGA) and application specific integrated circuit (ASIC).

The time space conversion unit C 81 converts the disparity of each pixel of the disparity image, output by the evaluation unit 38, into a time value. Specifically, the disparity "d" is converted into the distance "L1" using the formula (9), the distance "L1" is converted into the distance "R" using the formula (10), and then the distance "R" is converted into a time value "t" using the formula (1).

The time space conversion unit D 82 converts the frequency of frequency spectrum into the spectrum of time space using the formula (12).

The time range limitation unit 83 limits a time range used for detecting a peak having a power equal to or greater than a threshold value near the time converted by the time space conversion unit C 81.

The beat signal time determination unit 84 determines a local maximum value having a power equal to or greater than a threshold value within the time range limited by the time range limitation unit 83, in the time space spectrum.

The distance inverse conversion unit 85 converts the time determined by the beat signal time determination unit 84 into the distance "R" using the formula (1), and then converts the distance "R" into the distance "L2" viewed from the stereo image generation device 120 using the formula (10).

The disparity image distance fusion unit 86 fuses the distance "L1" determined for each pixel of the disparity image and the distance "L2" converted by the distance inverse conversion unit 85.

(Procedure)

Figure 29A:
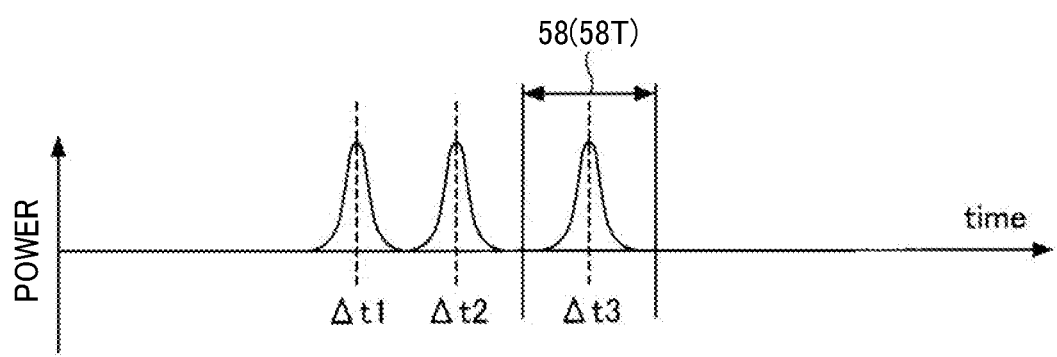
FIGS. 29A and 29B are examples of frequency spectrum of time space that is converted from a frequency spectrum of a beat signal according to the fourth embodiment.
Figure 29B:
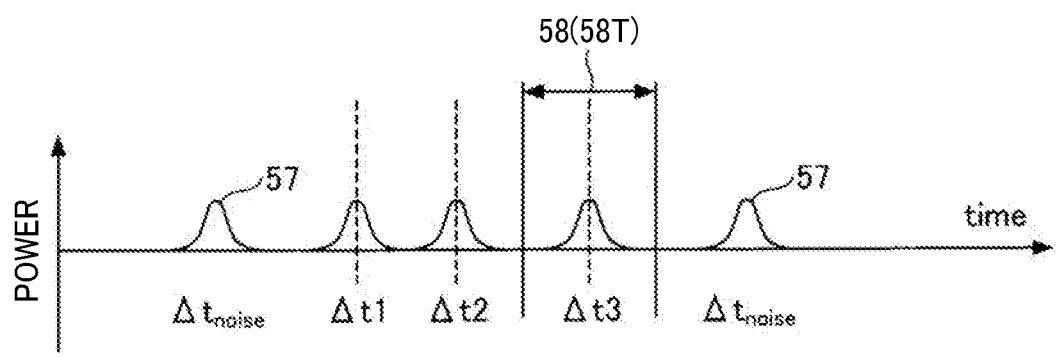
Figure 30:
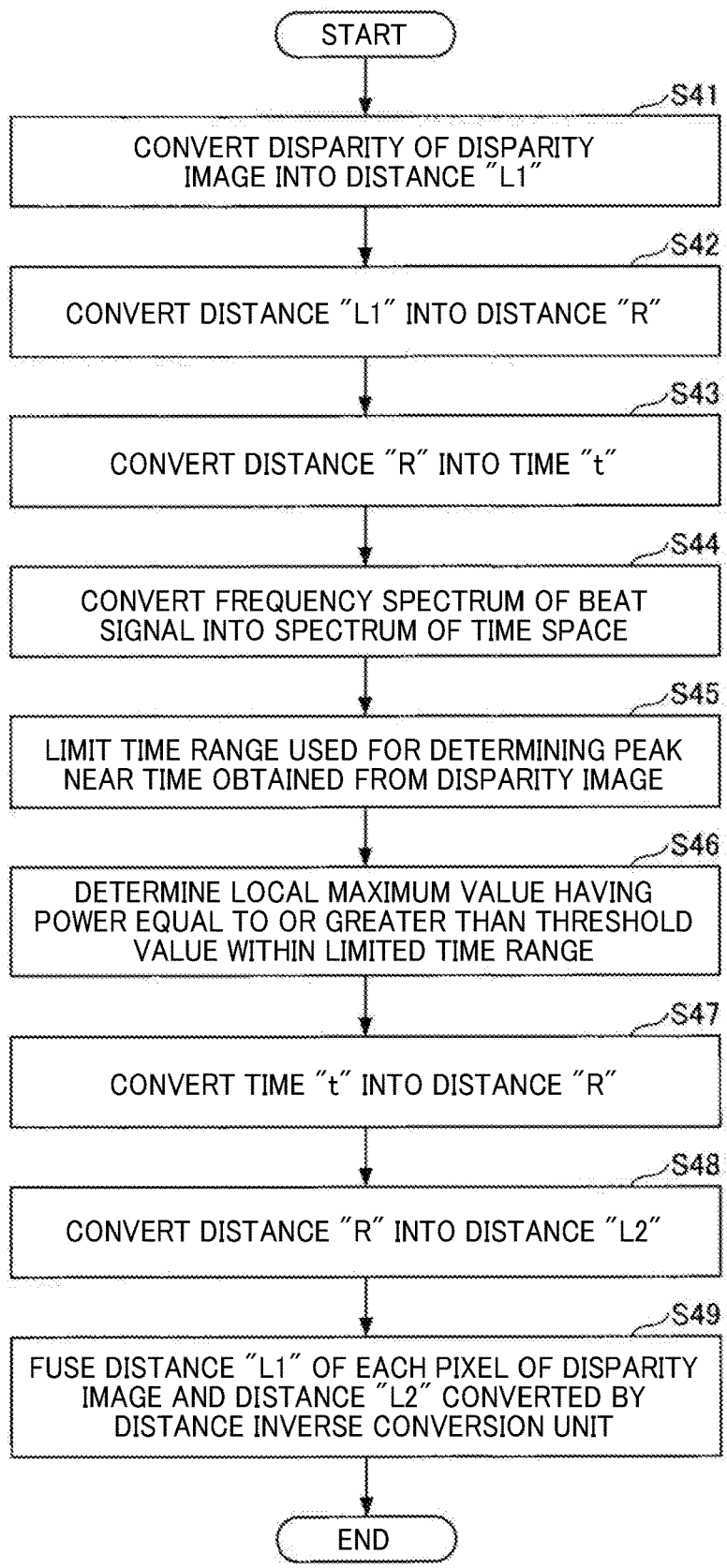
FIG. 30 is an example flowchart illustrating a procedure for fusing a distance of distance image in a time space and a distance detected by performing the FCM method according to the fourth embodiment.

Hereinafter, a description is given of a method of limiting the time range of beat signal with reference to FIGS. 29 and 30. FIG. 29 is an example of a frequency spectrum of time space that is converted from the frequency spectrum of beat signal. FIG. 29A illustrates one example state of the reflection wave not having a noise, and FIG. 29B illustrates another example state of the reflection wave having noises. FIG. 30 is an example flowchart illustrating a procedure for fusing the distance "L1" of the distance image in the time space and the distance "R" detected by performing the FCM method.

(Step S41) The time space conversion unit C 81 converts the disparity "d" of the disparity image into the distance "L1" using the formula (9).

(Step S42) Then, the time space conversion unit C 81 converts the distance "L1" into the distance "R" using the formula (10).

(Step S43) Then, the time space conversion unit C 81 converts the distance "R" into the time "t" using the formula (1).

(Step S44) Then, the time space conversion unit D 82 converts the frequency spectrum of beat signal into the spectrum of time space using the formula (12).

(Step S45) Then, the time range limitation unit 83 limits a time range used for determining a peak near the time obtained from the disparity image. For example, a parameter β used for determining the time range is set, in which "t±β" is set to limit of the time range used for detecting the peak of the frequency spectrum. The parameter β is a design value that is determined appropriately. The parameter β can be a fixed value or a variable value. In a case of the fixed value, an average of a half width of peak value can be used. In a case of the variable value, for example, about a half of the average of some peak values appearing in the spectrum of time space can be used.

In an example case of FIG. 29A, the limited time range of "t±β" is indicated by an arrow 58 (58T). Therefore, even if a peak 57 caused by a noise appears in the frequency spectrum as illustrated in FIG. 29B, the probability of detecting the noise erroneously as a peak related to the target object 26 can be reduced, in particular prevented.

(Step S46) Then, the beat signal time determination unit 84 determines a local maximum value having a power equal to or greater than a threshold value within the time range limited by the time range limitation unit 83, in the spectrum of time space. The threshold value is set as a power value that can be used for estimating a presence of the beat signal caused by the target object 26 existing in a space.

(Step S47) Then, the distance inverse conversion unit 85 converts the time "t" determined in step S46 into the distance "R" represented by the Rφθ polar coordinate system using the formula (1).

(Step S48) Then, the distance inverse conversion unit 85 converts the distance "R" into the distance "L2" represented by the coordinate system of the stereo image generation device 120 using the formula (10).

(Step S49) Then, the disparity image distance fusion unit 86 fuses the distance "L1" determined for each pixel of the disparity image and the distance "L2" converted by the distance inverse conversion unit 85. The processing of fusion may be the same as the first embodiment.

As to the above described fourth embodiment, the range finding system 100 can fuse the range finding value obtained by using the millimeter wave radar and the range finding value obtained by performing the block matching before converting the range finding value obtained by performing the block matching into the distance image. Therefore, the distance image having a smaller dispersion for the range finding value and a higher spatial resolution can be obtained even if the target object exists at the far distance position. Further, since the time range is limited in the spectrum of time space, obtained by performing the Fourier transform to the beat signal, based on the time value obtained by performing the block matching, the probability of detecting the noise erroneously as a peak related to the target object 26 can be reduced, thereby the number of the target objects and the distance to each target object can be detected with an improved precision.

Fifth Embodiment

In a fifth embodiment, a description is given of the range finding system 100 that can perform fail-safe processing when abnormality occurs in the range finding system 100 and display a message or sign indicting an occurrence of abnormality.

Figure 31:
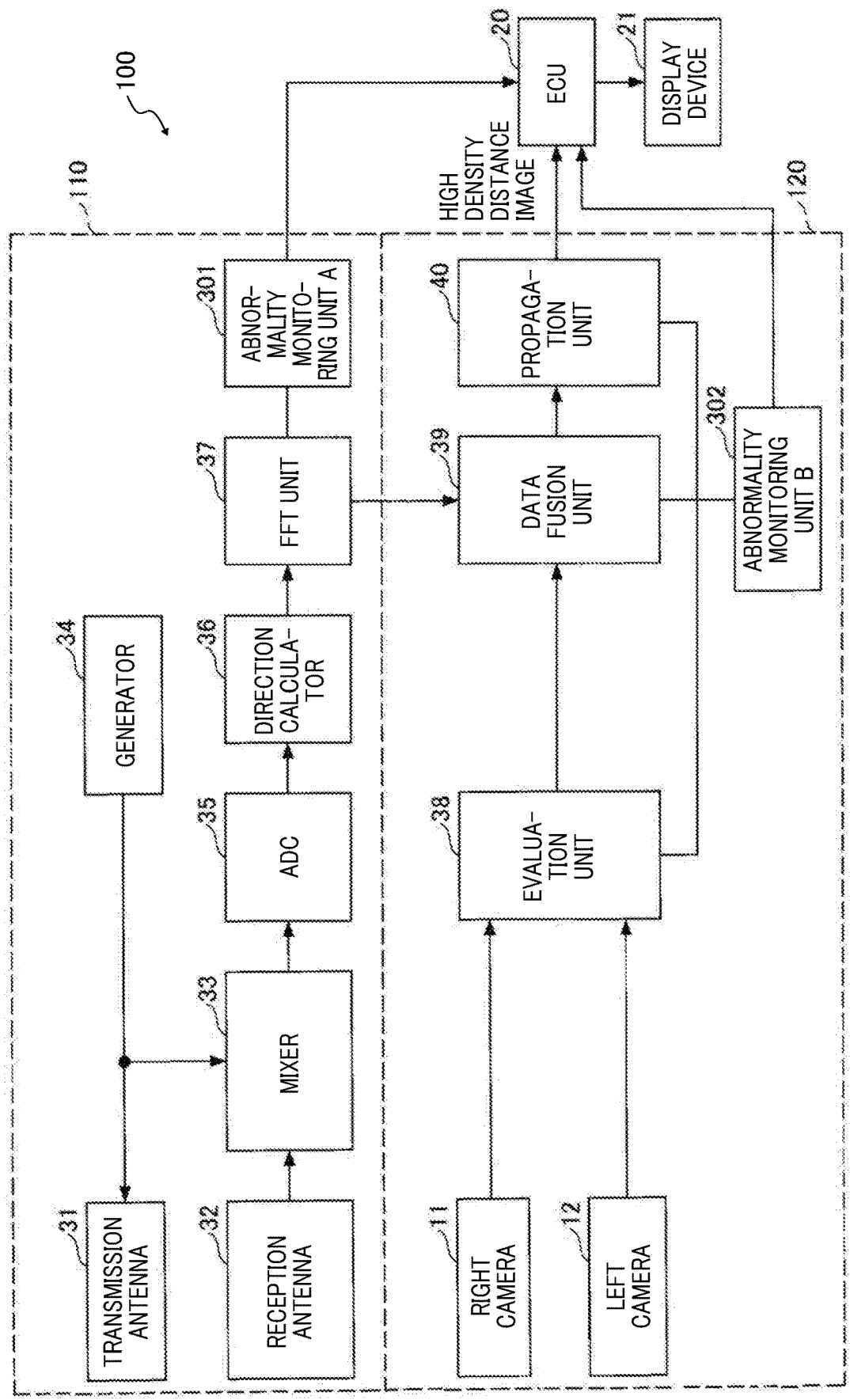
FIG. 31 illustrates an example of a range finding system according to a fifth embodiment.

FIG. 31 illustrates an example of the range finding system 100 according to the fifth embodiment. As to the description of FIG. 31, since the components having the same reference numerals of FIG. 12 perform the same functions, the main components of the fifth embodiment are described.

In the fifth embodiment, the range finding system 100 further includes, for example, an abnormality monitoring unit A 301 and an abnormality monitoring unit B 302. The abnormality monitoring unit A 301 monitors abnormality that occurs in the radar ranging device 110. For example, if the frequency spectrum detected by the FFT unit 37 does not change for a pre-set period of time or more, the abnormality monitoring unit A 301 determines that abnormality has occurred in the radar ranging device 110. Further, if the frequency becomes a value deviating from a pre-set value for a pre-set period of time or more or if the FFT unit 37 has reached a temperature equal to or greater than a pre-set temperature value, the abnormality monitoring unit A 301 determines that abnormality has occurred in the radar ranging device 110. The abnormality monitoring unit A 301 notifies the ECU 20 that the abnormality has occurred in the radar ranging device 110.

The abnormality monitoring unit B 302 monitors abnormality that occurs in the stereo image generation device 120. For example, if a pixel value of the reference image or the comparative image does not change for a pre-set period of time or more, the abnormality monitoring unit B 302 determines that abnormality has occurred in the stereo image generation device 120. Further, if a pixel value becomes a value deviating from a pre-set value for a pre-set period of time or more or if the evaluation unit 38 has reached a temperature equal to or greater than a pre-set temperature value, the abnormality monitoring unit B 302 determines that abnormality has occurred in the stereo image generation device 120. The abnormality monitoring unit B 302 notifies the ECU 20 that the abnormality has occurred in the stereo image generation device 120.

The ECU 20 obtains an abnormality notification from the abnormality monitoring unit A 301 and the abnormality monitoring unit B 302, and also detects that abnormality has occurred in the radar ranging device 110 when the abnormality monitoring unit A 301 does not respond. Further, the ECU 20 also detects that abnormality has occurred in the stereo image generation device 120 when the abnormality monitoring unit B 302 does not respond. For example, the ECU 20 detects that the ECU 20 cannot communicate with the radar ranging device 110 or the stereo image generation device 120, and the ECU 20 also detects that the ECU 20 does not receive a pre-set voltage (power-off state).

If the abnormality has occurred in the radar ranging device 110 alone, the ECU 20 can continue the drive assistance operation using the distance image generated by the stereo image generation device 120.

If the abnormality has occurred in the stereo image generation device 120 alone, the ECU 20 can acquire the frequency spectrum and the direction of the target object 26 from the FFT unit 37, calculate the distance information from the frequency spectrum, with which the ECU 20 can continue the drive assistance operation. Further, the distance information can be obtained instead of the frequency spectrum.

As above described, if at least any one of the radar ranging device 110 and the stereo image generation device 120 are being operated normally, the fusion cannot be performed, but the ECU 20 can continue the drive assistance operation using the distance image or distance information, with which the fail-safe processing can be performed.

Figure 32:
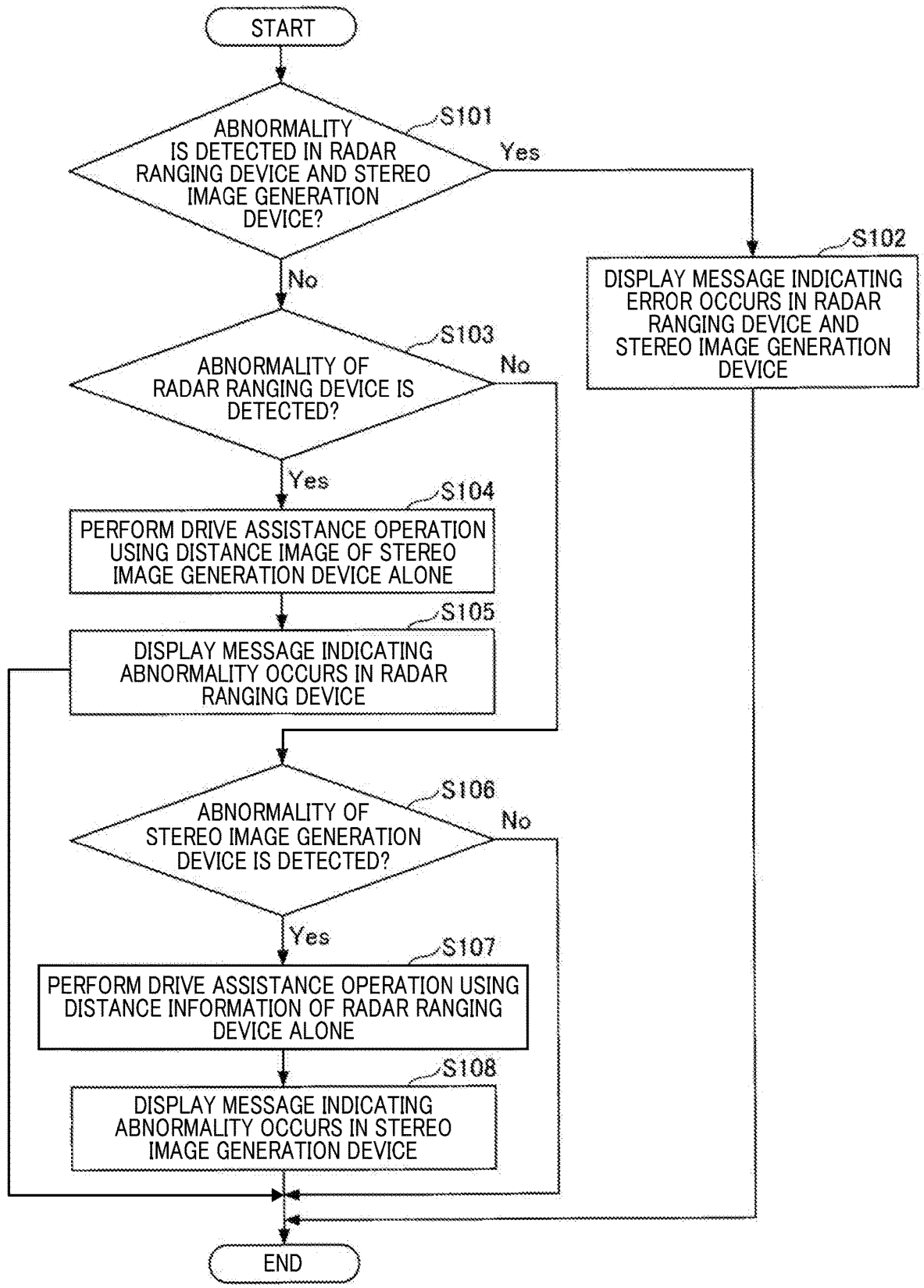
FIG. 32 is an example of a flowchart illustrating control processing performed by an electronic control unit (ECU) when abnormality has occurred in at least any one a radar ranging device and a stereo image generation device according to a fifth embodiment.

FIG. 32 is an example of a flowchart illustrating control processing performed by the ECU 20 when abnormality has occurred in the radar ranging device 110 or the stereo image generation device 120. The sequential processing of FIG. 32 is performed repeatedly while the movable apparatus 200 is traveling or running.

(Step S101) At first, the ECU 20 determines whether or not the abnormality is detected in both of the radar ranging device 110 and the stereo image generation device 120. The abnormality may be detected by the abnormality monitoring unit A 301, the abnormality monitoring unit B 302, or the ECU 20.

Figure 33A:
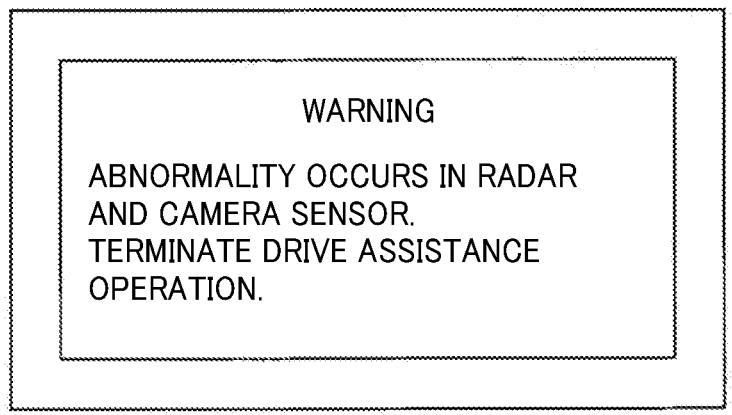
FIGS. 33A, 33B and 33C illustrate examples of messages displayed on a display device when abnormality occurs in a radar ranging device and a stereo image generation device or at least any one a radar ranging device and a stereo image generation device according to the fifth embodiment.

(Step S102) If the ECU 20 determines that the abnormality is detected in both of the radar ranging device 110 and the stereo image generation device 120 (step S101: Yes), the ECU 20 displays a message indicating that the abnormality occurs in the radar ranging device 110 and the stereo image generation device 120 on the display device 21. FIG. 33A illustrates an example of message displayed on the display device 21 when the abnormality occurs in the radar ranging device 110 and the stereo image generation device 120.

(Step S103) If the ECU 20 determines that the abnormality is not detected in both of the radar ranging device 110 and the stereo image generation device 120 (step S101: NO), the ECU 20 determines whether or not abnormality is detected in the radar ranging device 110. The abnormality may be detected by the abnormality monitoring unit A 301 or the ECU 20.

(Step S104) If the ECU 20 determines that the abnormality is detected in the radar ranging device 110 (step S103: Yes), the ECU 20 performs the drive assistance operation using the distance image of the stereo image generation device 120 alone. Specifically, the data fusion unit 39 converts the stereo matching cost into the distance to generate a distance image. Since the ECU 20 is performing the drive assistance operation using the distance image before detecting the abnormality in the radar ranging device 110, the ECU 20 can continue the drive assistance operation.

Figure 33B:
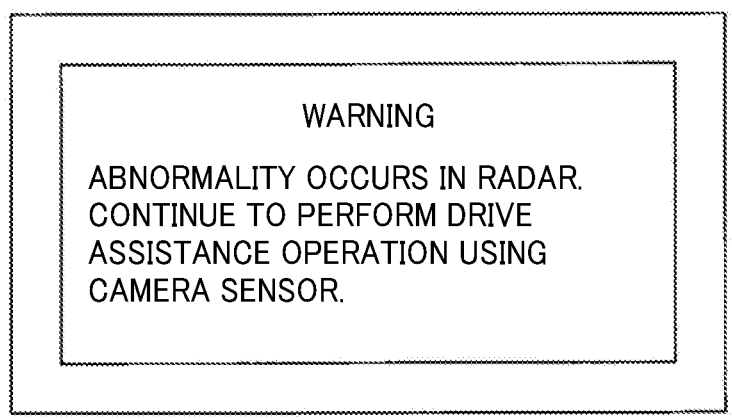

(Step S105) Then, the ECU 20 displays a message indicating that abnormality occurs in the radar ranging device 110 on the display device 21. FIG. 33B illustrates an example of message displayed on the display device 21 when the abnormality occurs in the radar ranging device 110.

(Step S106) If the ECU 20 determines that the abnormality is not detected in the radar ranging device 110 (step S103: No), the ECU 20 determines whether or not the abnormality is detected in the stereo image generation device 120. The abnormality may be detected by the abnormality monitoring unit B 302 or the ECU 20.

(Step S107) If the ECU 20 determines that the abnormality is detected in the stereo image generation device 120 (step S106: Yes), the ECU 20 performs the drive assistance operation using the distance information obtained by the radar ranging device 110 alone. Specifically, the FFT unit 37 converts the frequency spectrum into the distance information and outputs the distance information and the direction information to the ECU 20, which is an external device for the FFT unit 37. Then, the ECU 20 performs the drive assistance operation based on an orientation or direction to the target object 26 (irradiation direction) and the distance to the target object 26 instead of using the distance image.

Figure 33C:
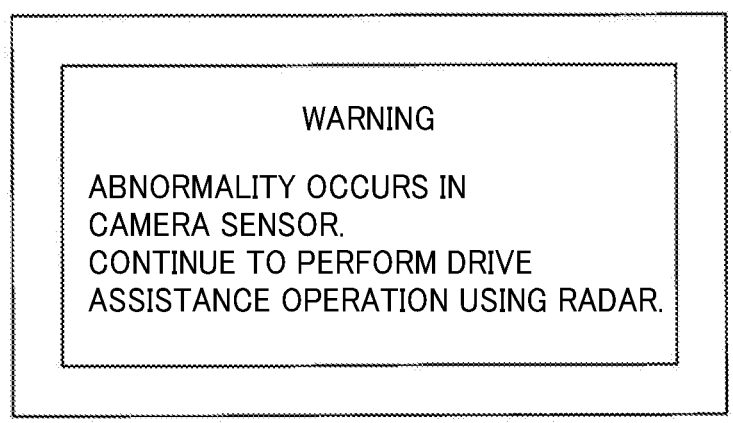

(Step S108) Then, the ECU 20 displays a message indicating that abnormality occurs in the stereo image generation device 120 on the display device 21. FIG. 33C illustrates an example of message displayed on the display device 21 when the abnormality occurs in the stereo image generation device 120.

With this configuration, even if the abnormality has occurred in any one of the radar ranging device 110 and the stereo image generation device 120, the ECU 20 can continue to perform the drive assistance operation.

FIG. 33 illustrates examples of a display message when an abnormality occurs in the radar ranging device 110 or the stereo image generation device 120.

FIG. 33A illustrates an example of a message displayed on the display device 21 when the abnormality occurs in the radar ranging device 110 and the stereo image generation device 120. In a case of FIG. 33A, a message of "Warning. Abnormality occurs in radar and camera sensor. Terminate drive assistance operation" is displayed. With this configuration, an occupant of the movable apparatus, such as a driver, can recognize that the drive assistance operation cannot be continued because the abnormality occurs in the radar ranging device 110 and the stereo image generation device 120.

FIG. 33B illustrates an example of a message displayed on the display device 21 when the abnormality occurs in the radar ranging device 110. In a case of FIG. 33B, a message of "Warning Abnormality occurs in radar. Continue to perform drive assistance operation using camera sensor" is displayed. With this configuration, an occupant of the movable apparatus, such as a driver, can recognize that the drive assistance operation can be continued although the abnormality has occurred in the radar ranging device 110.

FIG. 33C illustrates an example of a message displayed on the display device 21 when the abnormality occurs in the stereo image generation device 120. In a case of FIG. 33C, a message of "Warning Abnormality occurs in camera sensor. Continue to perform drive assistance operation using radar" is displayed. With this configuration, an occupant of the movable apparatus, such as a driver, can recognize that the drive assistance operation can be continued although the abnormality has occurred in the stereo image generation device 120.

Sixth Embodiment

In a sixth embodiment, a description is given of the range finding system 100 that partially fuses the range finding value measured by the stereo image generation device 120 and the range finding value measured by the radar ranging device 110. In the above described second and third embodiments, the frequency spectrum is fused to the stereo matching cost of the pixels corresponding to the arrival direction θ of the reflection wave (reception wave).

In the sixth embodiment, as illustrated in FIG. 34, the frequency spectrum is not generated for all of pixels corresponding to the arrival direction of the reflection wave, but the frequency spectrum is generated based on a state of the frequency spectrum and a state of the stereo matching cost.

FIG. 34 schematically illustrates image data, irradiation positions of the millimeter wave, and the stereo matching cost. In FIG. 34, two pixels 401 and 402 are indicated as examples of the pixels. The pixel column of image data is identified by the arrival direction θ of the reflection wave (reception wave). As illustrated in FIG. 34, the stereo matching cost $C(p,Z)$ of the pixel 401 becomes smooth (i.e., local maximum or local minimum is not clear) while the stereo matching cost $C(p,Z)$ of the pixel 402 becomes convex to a downward (i.e., local minimum value is clear). Therefore, the local minimum value of the stereo matching cost $C(p,Z)$ is hard to find for the pixel 401 while the local minimum value of the stereo matching cost $C(p,Z)$ is easy to find for the pixel 402.

FIG. 35 is an example of a diagram illustrating a fusion of the frequency spectrum and the stereo matching cost $C(p,f)$. As similar to the second embodiment, the disparity of disparity image is converted into the frequency.

Figure 35A:
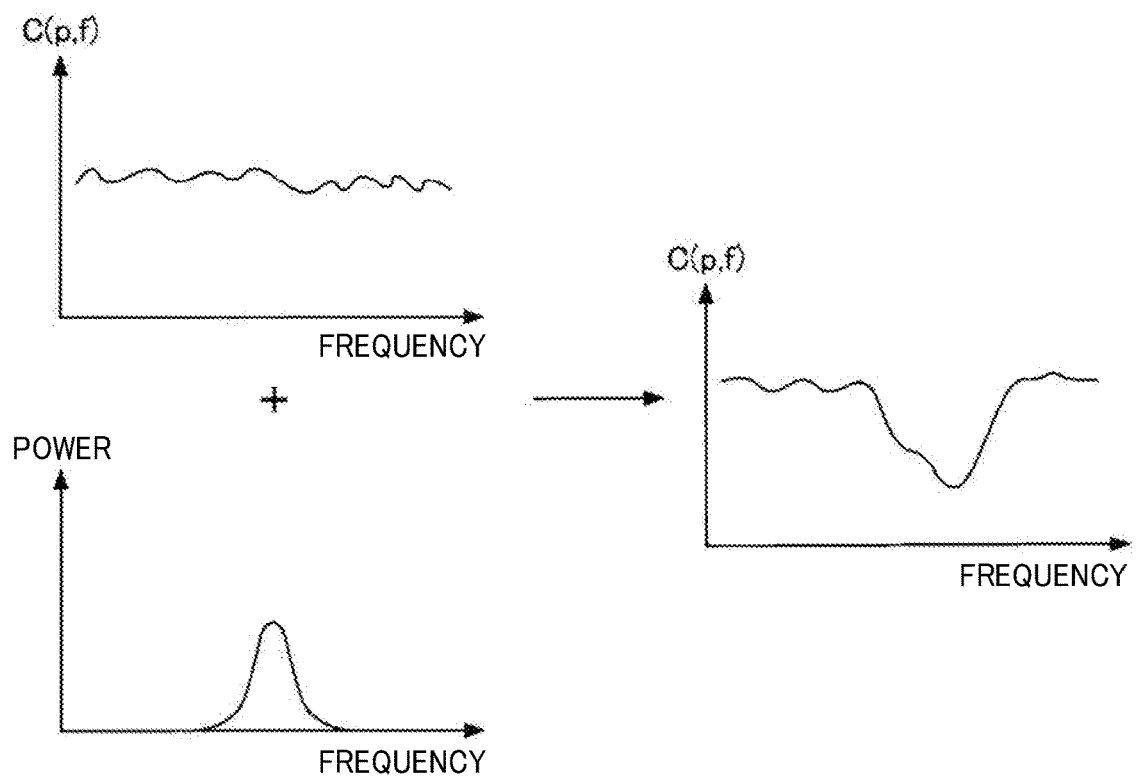
FIGS. 35A and 35B illustrate examples of fusion of stereo matching cost and frequency spectrum for one pixel and another pixel, respectively.
Figure 35B:
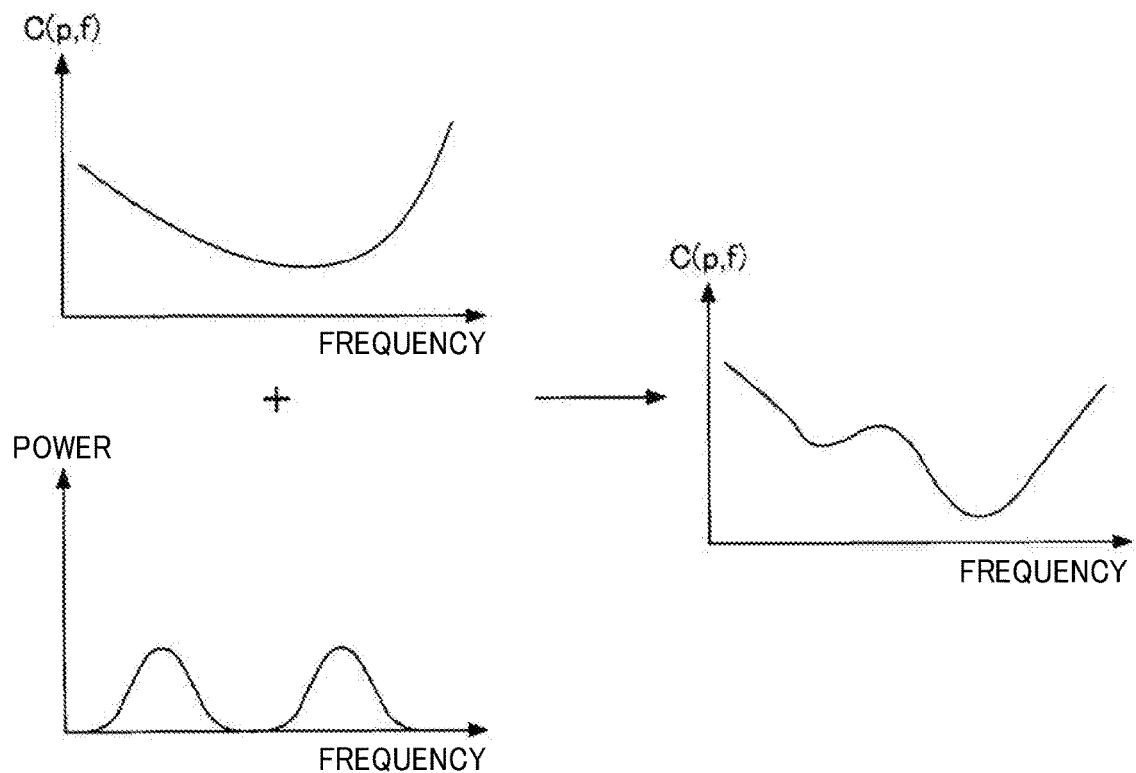

FIG. 35A illustrates an example of a fusion of the stereo matching cost and the frequency spectrum for the pixel 401, and FIG. 35B illustrates an example a fusion of the stereo matching cost and the frequency spectrum for the pixel 402. In an example case of FIG. 35A, the frequency spectrum has one peak clearly. Therefore, the local minimum value is clearly found or detected in the fusion cost curve that fuses the stereo matching cost and the frequency spectrum. As described in the second embodiment, the peak of the frequency spectrum is inverted and then fused with the stereo matching cost.

On the other hand, when the frequency spectrum has a plurality of peaks as illustrated in FIG. 35B, it is effective to fuse the stereo matching cost and the frequency spectrum. In an example case of FIG. 35B, the frequency spectrum has two peaks. The waveform of FIG. 35B may occur when two or more target objects exist. In an example case of FIG. 35B, the local minimum value can be found or detected clearly by fusing the stereo matching cost and the frequency spectrum.

Therefore, the stereo image generation device 120 can select methods for the fusing from the below methods 1 and 2.

Method 1: If the stereo matching cost becomes substantially constant value (i.e., a value profile becomes substantially flat) and the frequency spectrum has one peak alone, the frequency spectrum and the stereo matching cost are fused.

Method 2: If the frequency spectrum has a plurality of peaks and the stereo matching cost has one local minimum value alone, the frequency spectrum and the stereo matching cost are fused.

In other words, if the stereo matching cost becomes substantially constant value (i.e., a value profile becomes substantially flat) and the frequency spectrum has a plurality of peaks, the fusion may be omitted because the effect of fusion is difficult to obtain. Further, if the local minimum value of the stereo matching cost is clear and the frequency spectrum has one peak alone, it can be assumed that the target object is already detected with a higher probability, and thereby the fusion can be omitted, in which the fusion may be performed to confirm the detection of target object.

Whether the stereo matching cost becomes substantially constant value (i.e., a value profile becomes substantially flat) or not can be determined, for example, by comparing a difference between the minimum value and the maximum value against a threshold value. If the difference is sufficiently greater than the threshold value, it can be assumed that the minimum value exists clearly. Further, whether the frequency spectrum has a plurality of peaks or not can be determined, for example, by determining whether the number of local maximum values equal to or greater than a threshold value is two or more.

Seventh Embodiment

In a seventh embodiment, a description is given of a distance image providing system, in which at least a part of the processing is performed by a server. For example, the processing performable by the range finding system 100 described as the first to fifth embodiments can be performed by the server.

Figure 36:
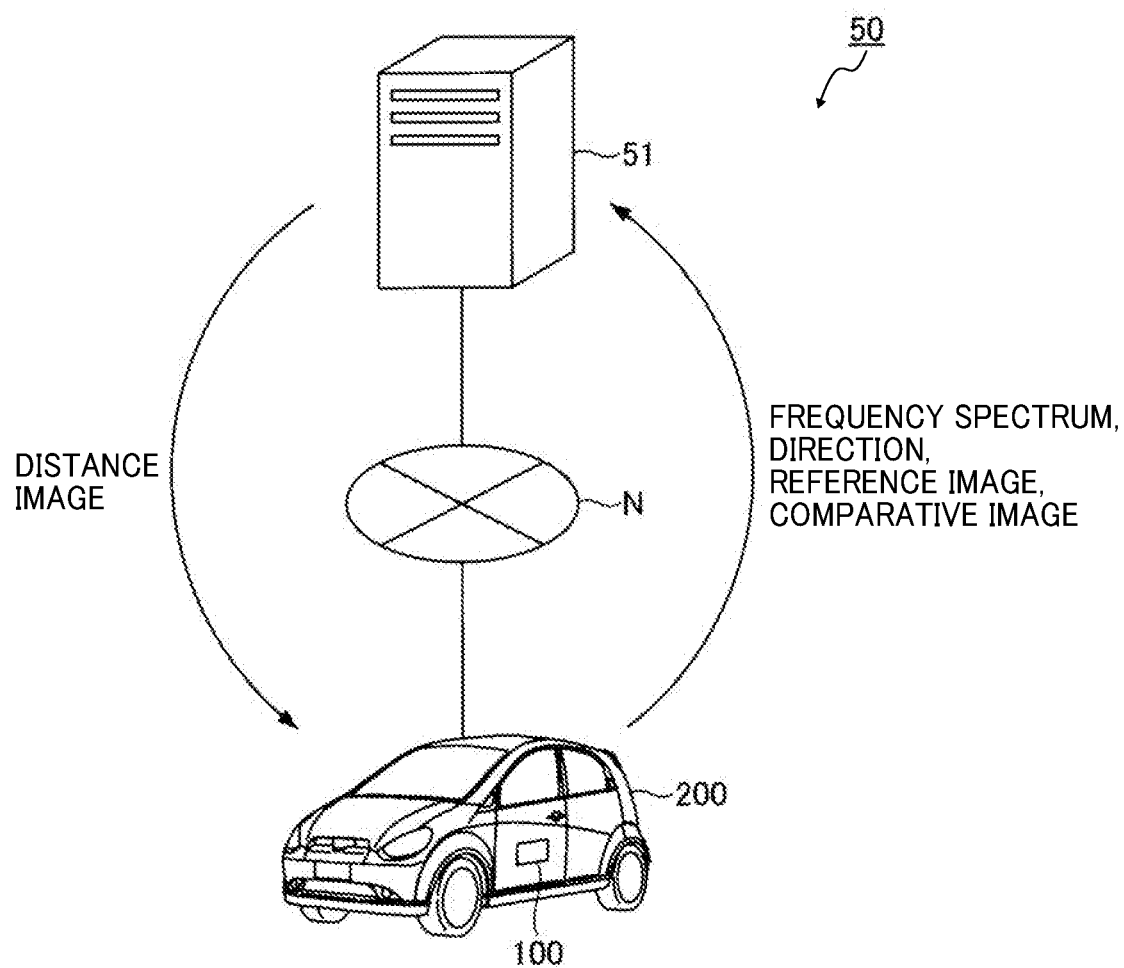
FIG. 36 is an example of a schematic configuration of a distance image providing system according to a seventh embodiment.

FIG. 36 illustrates a schematic configuration of a distance image providing system 50 of the seventh embodiment. As illustrated in FIG. 36, the range finding system 100 mounted on the movable apparatus 200 communicates with a server 51 via a network N. The range finding system 100 transmits the frequency spectrum, the direction information, the reference image and the comparative image to the server 51, and then the server 51 performs the processing of at least any one of the first to fifth embodiments to generate a distance image, and then transmits the distance image to the range finding system 100.

Figure 37:
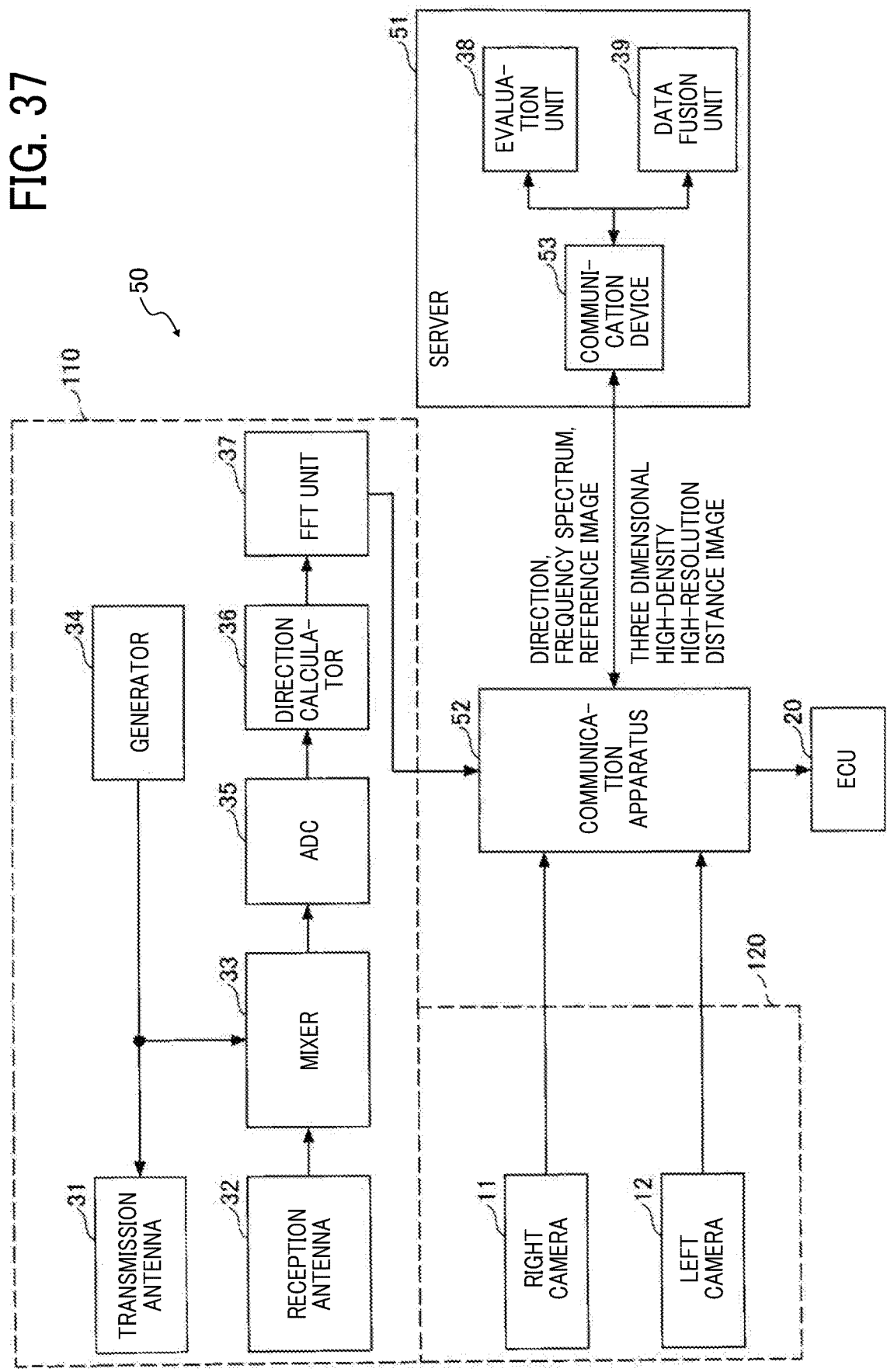
FIG. 37 is an example of a functional block diagram of the distance image providing system of FIG. 36.

FIG. 37 is an example of a functional block diagram of the distance image providing system 50 according to the seventh embodiment. The function of the radar ranging device 110 of the seventh embodiment is the same as the radar ranging device 110 in the first embodiment described in FIG. 12, but the radar ranging device 110 in FIG. 37 transmits the frequency spectrum and the direction information to a communication apparatus 52. The stereo image generation device 120 of the seventh embodiment does not need to include the evaluation unit 38 and the data fusion unit 39, and the right camera 11 and the left camera 12 transmit the reference image and the comparative image to the communication apparatus 52. Then, the communication apparatus 52 transmits the frequency spectrum, the direction information, the reference image and the comparative image to the server 51.

As illustrated in FIG. 37, the server 51 includes, for example, a communication device 53, the evaluation unit 38 and the data fusion unit 39 to perform the processing of the first to fifth embodiments to create or generate a distance image, such as three dimensional high-density high-resolution distance image. Then, the communication device 53 of the server 51 transmits the distance image to the movable apparatus 200.

By transmitting the distance image and the distance information to the ECU 20 from the server 51, the ECU 20 can perform the drive assistance operation for the movable apparatus 200 in the same manner of the above described first to fifth embodiments.

In the seventh embodiment, since the movable apparatus 200 and the server 51 communicate with each other to generate or create the distance image and the distance information, the configuration of the range finding system 100 can be simplified and the cost of the range finding system 100 can be reduced.

Further, the server 51 can be configured to transmit the distance image and the distance information to another movable apparatus, different from the movable apparatus 200 that has transmitted the information to the server 51. For example, when the movable apparatus 200 at the very front of a traffic jam transmits information of the irradiation direction, the distance information, the reference image and the comparative image to the server 51, the server 51 can transmit the distance image and the distance information to another movable apparatus which is traveling after the movable apparatus 200. With this configuration, the following movable apparatus can recognize the state of the movable apparatus 200 existing at the very front of the traffic jam.

As to the above described embodiments, the stereo camera having higher spatial resolution and lower distance resolution, and the system having lower spatial resolution and higher distance resolution, such as the LIDAR, FCM or FMCW, can be fused effectively to provide the range finding method that can effectively combine or integrate advantages of different types of the range finding or detection devices.

Each of the embodiments described above is presented as an example, and it is not intended to limit the scope of the present disclosure. Numerous additional modifications and variations are possible in light of the above teachings. It is therefore to be understood that, within the scope of the appended claims, the disclosure of this specification can be practiced otherwise than as specifically described herein. Any one of the above-described operations may be performed in various other ways, for example, in an order different from the one described above.

For example, the movable apparatus 200 mounted with the range finding system 100 can be vehicles or automobiles, but the range finding system 100 can be applied to any movable apparatus. For example, the range finding system 100 can be effectively applied to various movable apparatuses that can move autonomously even if humans operate at least in part or do not operate the movable apparatuses. For example, the range finding system 100 can be applied to airplanes, drones, ships, robots, or the like.

As to the wavelength of the millimeter wave radar, radio wave having a given wavelength range suitable for the range finding can be used. For example, visible light, infrared light, and ultraviolet light (within the range not affecting human body) can be used, and the electromagnetic wave can be used instead of the light.

Further, in the above described embodiments, the range finding system using the millimeter wave radar and having higher distance resolution is described, but other range finding system using, such as the LIDAR or ultrasonic wave (acoustic wave, sonar), can be employed.

Further, in the above described embodiments, the stereo camera has two imaging units, but the stereo camera can have three or more imaging units. Further, the two imaging units can be spaced apart in the horizontal direction or the vertical direction. Further, the imaging unit can be configured to capture not only the visible light but also other light, such as near-infrared and infrared light, for capturing images of objects. Further, the imaging unit can be configured to capture images of objects via a polarization filter.

Further, in the above described embodiments, the FFT unit 37 is an example of the acquisition unit, the evaluation unit 38 is an example of the generation unit, the data fusion unit 39 is an example of the fusion unit, the abnormality monitoring unit A 301 is an example of the first abnormality detection unit, the abnormality monitoring unit B 302 is an example of the second abnormality detection unit, the function provided by the radar ranging device 110 is an example of the first function, and the function provided by the stereo image generation device 120 is an example of the second function.

Each of the functions of the above-described embodiments can be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), system on a chip (SOC), graphics processing unit (GPU), and conventional circuit components arranged to perform the recited functions.

What is claimed is:

1. A method of finding a range to a target object, comprising:
    extracting a signal component from a beat signal obtained by synthesizing a transmission wave which is a chirp signal irradiated onto the target object and a reflection wave reflected and received from the target object;
    generating a matching evaluation value of a plurality of image data of the target object captured by an imaging device;
    fusing the signal component and the matching evaluation value before generating a distance image from the matching evaluation value; and
    setting distance information for each pixel of the image data of the target object based on the signal component and the matching evaluation value fused together to generate a distance image.

2. The method according to claim 1, further comprising:
    limiting a range used for determining a local maximum value of the signal component based on the matching evaluation value; and
    calculating a distance to the target object based on the signal component having the local maximum value within the range.

3. The method according to claim 1,
    wherein the signal component is a frequency component of the beat signal,
    the method further comprising:
    converting the matching evaluation value into a frequency value;
    limiting a range of the frequency component of the beat signal based on the frequency value converted from the matching evaluation value;
    determining a specific frequency having a local maximum value from the limited range of the frequency component of the beat signal; and
    converting the determined specific frequency into a distance to generate the distance image.

4. The method according to claim 1,
    wherein the signal component is a frequency component of the beat signal,
    the method further comprising:
    converting the matching evaluation value into a time value;
    converting the frequency component of the beat signal into a time component;
    limiting a range of the time component of the beat signal based on the time value converted from the matching evaluation value;
    determining a specific time having a local maximum value within the limited range of the time component of the beat signal; and
    converting the determined specific time into a distance to generate the distance image.

5. The method according to claim 1,
    wherein the generating generates the matching evaluation value for each one of a plurality of disparities of a disparity image of the target object,
    wherein the fusing includes
    adjusting a horizontal axis of the matching evaluation value represented by disparity and a horizontal axis of the signal component into the same specific physical quantity,
    fusing the matching evaluation value and the signal component as a fusion cost curve, and
    calculating a distance to the target object based on a local minimum value in the fusion cost curve represented by the same specific physical quantity.

6. The method according to claim 5,
    wherein the signal component is a frequency component of the beat signal,
    wherein the fusing includes
    converting the horizontal axis of the matching evaluation value from a disparity axis into a frequency axis,
    fusing the matching evaluation value and the signal component calculated along the frequency axis as a fusion cost curve, and
    calculating the distance to the target object based on a specific frequency indicating the local minimum value in the fusion cost curve.

7. The method according to claim 5,
    wherein the signal component is a frequency component of the beat signal,
    wherein the fusing includes
    converting the horizontal axis of the matching evaluation value from a disparity axis into a time axis,
    converting the signal component calculated along a frequency axis into the frequency component of the beat signal calculated along a time axis, fusing the matching evaluation value and the signal component of the beat signal calculated along the time axis as a fusion cost curve, and calculating the distance to the target object based on a specific time indicating the local minimum value in the fusion cost curve.

8. The method according to claim 5, wherein when the matching evaluation value becomes substantially a constant value and the frequency component of the beat signal has one peak alone, the fusing fuses the matching evaluation value and the signal component, wherein when the frequency component of the beat signal has a plurality of peaks and the matching evaluation value has one local minimum value alone, the fusing fuses the matching evaluation value and the signal component.

9. The method according to according to claim 1, further comprising:

detecting whether abnormality occurs in a first unit, the first unit being configured to perform a first function used for emitting the transmission wave, receiving the reflection wave, and processing the beat signal;

detecting whether abnormality occurs in a second unit, the second unit being configured to perform a second function used for capturing image data and processing the captured image data; and displaying, on a display device, a message of detecting the abnormality in at least one of the first function and the second function in response to detecting the abnormality in the first function or the second function.

10. The method according to claim 9, further comprising:

in response to detecting the abnormality in the first function, generating the distance image using distance information associated with each pixel of the image data based on the matching evaluation value calculated for the plurality of image data; and in response to detecting the abnormality in the second function, outputting, to a control unit, distance information based on the signal component that is obtained using the first function.

11. A range finding apparatus comprising:
circuitry configured to extract a signal component from a beat signal obtained by synthesizing a transmission wave which is a chirp signal irradiated onto a target object and a reflection wave reflected and received from the target object;

generate a matching evaluation value of a plurality of image data of the target object captured by an imaging device;

fuse the signal component and the matching evaluation value before generating a distance image from the matching evaluation value; and set distance information for each pixel of the image data of the target object based on the signal component and the matching evaluation value fused together to generate the distance image.

12. A vehicle-mounted apparatus comprising:
the range finding apparatus of claim 11; and
an output unit configured to output the distance image to a control unit of a movable apparatus.

13. A movable apparatus comprising:
the range finding apparatus of claim 11; and
a control unit configured to control the movable apparatus based on the distance image.

14. A range finding system comprising:
a range finding device configured to emit a transmission wave to a target object and receive a reflection wave returned from the target object;

an imaging device configured to capture a plurality of image data of the target object; and circuitry configured to extract a signal component from a beat signal obtained by synthesizing a transmission wave which is a chirp signal irradiated onto a target object and a reflection wave reflected and received from the target object;

generate a matching evaluation value of a plurality of image data of the target object captured by an imaging device;

fuse the signal component and the matching evaluation value before generating a distance image from the matching evaluation value; and set distance information for each pixel of the image data of the target object based on the signal component and the matching evaluation value fused together to generate the distance image.

* * * * *